(12) United States Patent
Yunoki et al.

(10) Patent No.: US 11,105,652 B2
(45) Date of Patent: Aug. 31, 2021

(54) INFORMATION PROCESSING APPARATUS AND AUTOMATIC DRIVING TRACK MANAGEMENT SYSTEM

(71) Applicant: HITACHI, LTD., Tokyo (JP)

(72) Inventors: Shoji Yunoki, Tokyo (JP); Hiroyuki Kubo, Tokyo (JP)

(73) Assignee: HITACHI, LTD., Tokyo (JP)

( * ) Notice: Subject to any disclaimer, the term of this patent is extended or adjusted under 35 U.S.C. 154(b) by 267 days.

(21) Appl. No.: 16/260,960

(22) Filed: Jan. 29, 2019

(65) Prior Publication Data
US 2019/0234753 A1  Aug. 1, 2019

(30) Foreign Application Priority Data
Jan. 31, 2018 (JP) .............................. JP2018-015307

(51) Int. Cl.
*G01C 21/32* (2006.01)
*G01C 21/36* (2006.01)
(Continued)

(52) U.S. Cl.
CPC .......... *G01C 21/367* (2013.01); *G01C 21/14* (2013.01); *G01C 21/32* (2013.01);
(Continued)

(58) Field of Classification Search
CPC .. G01C 21/367; G01C 21/32; G01C 21/3492; G01C 21/14; G05D 1/0274; G05D 2201/0213; G08G 1/0112
See application file for complete search history.

(56) References Cited

U.S. PATENT DOCUMENTS

| 5,926,117 A | 7/1999 | Gunji et al. |
| 2013/0018571 A1* | 1/2013 | Miwa ................... G08G 1/0969 701/118 |
| 2017/0176991 A1* | 6/2017 | Hoskeri ............... B60W 10/04 |

FOREIGN PATENT DOCUMENTS

| JP | 11-003499 A | 1/1999 |
| JP | 2000-322691 A | 11/2000 |

(Continued)

OTHER PUBLICATIONS

English Translation_KR20170087156A (Year: 2017).*
(Continued)

*Primary Examiner* — Peter D Nolan
*Assistant Examiner* — Ashley L Redhead, Jr.
(74) *Attorney, Agent, or Firm* — Volpe Koenig

(57) ABSTRACT

Provided is an information processing apparatus including: a processor; a storage device that is connected to the processor; a display apparatus that is connected to the processor; and a communication apparatus that is connected to the processor and communicates with a server apparatus, wherein the storage device holds map information indicating a connection relationship between roads, when the processor receives information indicating a completion degree of automatic driving track information including coordinate values of a traveling track when a vehicle travels on each road by automatic driving from the server apparatus through the communication apparatus, the processor holds the information indicating the completion degree in the storage device, and the display apparatus displays a map including the roads based on the map information, and superimposes and displays information indicating the completion degree calculated for each of the roads on the map.

15 Claims, 28 Drawing Sheets

(51) Int. Cl.
    *G05D 1/02*          (2020.01)
    *G01C 21/14*        (2006.01)
    *G01C 21/34*        (2006.01)
    *G08G 1/01*          (2006.01)

(52) U.S. Cl.
    CPC ....... *G01C 21/3492* (2013.01); *G05D 1/0274* (2013.01); *G05D 2201/0213* (2013.01); *G08G 1/0112* (2013.01)

(56) References Cited

FOREIGN PATENT DOCUMENTS

| | | | |
|---|---|---|---|
| JP | 2003-203296 A | | 7/2003 |
| KR | 10-2017-0087156 A | | 7/2017 |
| KR | 20170087156 A | * | 7/2017 |
| WO | 2018/015811 A1 | | 1/2018 |
| WO | WO-2018015811 A1 | * | 1/2018 ......... G06K 9/00791 |

OTHER PUBLICATIONS

English Translation_WO2018/015811A1 (Year: 2018).*
Extended European Search Report dated Jul. 1, 2019 for the European Patent Application No. 19153739.8.
Japanese Office Action dated Jan. 19, 2021 for Japanese Patent Application No. 2018-015307.

* cited by examiner

CURRENT POSITION

ONE DEGREE LATITUDE=111,263.283m

LATITUDE CORRESPONDING TO 1 M=$8.98769093 \times 10^{-6}$

LENGTH OF 1 SECOND LONGITUDE AT
35 DEGREES NORTH LATITUDE=25.358m

LONGITUDE CORRESPONDING TO 1 M=$1.095426 \times 10^{-5}$

FIG. 5

| NODE ID | LATITUDE | LONGITUDE | NODE ID = RELATIVE POSITION x FROM 1 (NORTH DIRECTION IS x COORDINATE) | NODE ID = RELATIVE POSITION y FROM 1 (EAST DIRECTION IS y COORDINATE) |
|---|---|---|---|---|
| 1 | 35.000000 DEGREES NORTH LATITUDE | 135.000000 DEGREES EAST LONGITUDE | 0 | 0 |
| 2 | 35.008988 DEGREES NORTH LATITUDE | 135.000000 DEGREES EAST LONGITUDE | 0 | 1000 |
| 3 | 35.017976 DEGREES NORTH LATITUDE | 135.000000 DEGREES EAST LONGITUDE | 0 | 2000 |
| 4 | 35.000000 DEGREES NORTH LATITUDE | 135.010954 DEGREES EAST LONGITUDE | 1000 | 0 |
| 5 | 35.008988 DEGREES NORTH LATITUDE | 135.010954 DEGREES EAST LONGITUDE | 1000 | 1000 |
| 6 | 35.017976 DEGREES NORTH LATITUDE | 135.010954 DEGREES EAST LONGITUDE | 1000 | 2000 |

FIG. 7

| LINK ID | COORDINATE GROUP |
|---|---|
| 1 | XX DEGREES NORTH LATITUDE, YY DEGREES EAST LONGITUDE, ZZ DEGREES NORTH LATITUDE, AA DEGREES EAST LONGITUDE, .. |
| 2 | XX DEGREES NORTH LATITUDE, YY DEGREES EAST LONGITUDE, ZZ DEGREES NORTH LATITUDE, AA DEGREES EAST LONGITUDE, .. |
| 3 | — |
| 4 | XX DEGREES NORTH LATITUDE, YY DEGREES EAST LONGITUDE, ZZ DEGREES NORTH LATITUDE, AA DEGREES EAST LONGITUDE, .. |
| 5 | XX DEGREES NORTH LATITUDE, YY DEGREES EAST LONGITUDE, ZZ DEGREES NORTH LATITUDE, AA DEGREES EAST LONGITUDE, .. |
| 6 | XX DEGREES NORTH LATITUDE, YY DEGREES EAST LONGITUDE, ZZ DEGREES NORTH LATITUDE, AA DEGREES EAST LONGITUDE, .. |
| 7 | XX DEGREES NORTH LATITUDE, YY DEGREES EAST LONGITUDE, ZZ DEGREES NORTH LATITUDE, AA DEGREES EAST LONGITUDE, .. |
| 8 | — |
| 9 | XX DEGREES NORTH LATITUDE, YY DEGREES EAST LONGITUDE, ZZ DEGREES NORTH LATITUDE, AA DEGREES EAST LONGITUDE, .. |
| 10 | — |
| 11 | XX DEGREES NORTH LATITUDE, YY DEGREES EAST LONGITUDE, ZZ DEGREES NORTH LATITUDE, AA DEGREES EAST LONGITUDE, .. |
| 12 | XX DEGREES NORTH LATITUDE, YY DEGREES EAST LONGITUDE, ZZ DEGREES NORTH LATITUDE, AA DEGREES EAST LONGITUDE, .. |
| 13 | XX DEGREES NORTH LATITUDE, YY DEGREES EAST LONGITUDE, ZZ DEGREES NORTH LATITUDE, AA DEGREES EAST LONGITUDE, .. |
| 14 | XX DEGREES NORTH LATITUDE, YY DEGREES EAST LONGITUDE, ZZ DEGREES NORTH LATITUDE, AA DEGREES EAST LONGITUDE, .. |

FIG. 16

| COORDINATE NUMBER j | TRAVELING TRACK 1 (i = 1) | TRAVELING TRACK 2 (i = 2) | TRAVELING TRACK 3 (i = 3) |
|---|---|---|---|
| 1 | 35.0000000 DEGREES NORTH LATITUDE, 135.00001424 0538 DEGREES EAST LONGITUDE | 35.0000018 DEGREES NORTH LATITUDE, 135.00001 75268 16 DEGREES EAST LONGITUDE | 35.0000009 DEGREES NORTH LATITUDE, 135.00001862 2242 DEGREES EAST LONGITUDE |
| 2 | 35.0000090 DEGREES NORTH LATITUDE, 135.00001424 0538 DEGREES EAST LONGITUDE | 35.0000108 DEGREES NORTH LATITUDE, 135.00001 75268 16 DEGREES EAST LONGITUDE | 35.0000099 DEGREES NORTH LATITUDE, 135.00001862 2242 DEGREES EAST LONGITUDE |
| 3 | 35.0000180 DEGREES NORTH LATITUDE, 135.00001314 5112 DEGREES EAST LONGITUDE | 35.0000198 DEGREES NORTH LATITUDE, 135.00001 75268 16 DEGREES EAST LONGITUDE | 35.0000189 DEGREES NORTH LATITUDE, 135.00001 75268 16 DEGREES EAST LONGITUDE |
| 4 | 35.0000270 DEGREES NORTH LATITUDE, 135.00001314 5112 DEGREES EAST LONGITUDE | 35.0000288 DEGREES NORTH LATITUDE, 135.00001643 139 DEGREES EAST LONGITUDE | 35.0000279 DEGREES NORTH LATITUDE, 135.00001 75268 16 DEGREES EAST LONGITUDE |
| 5 | 35.0000360 DEGREES NORTH LATITUDE, 135.00001314 5112 DEGREES EAST LONGITUDE | 35.0000377 DEGREES NORTH LATITUDE, 135.00001533 5964 DEGREES EAST LONGITUDE | 35.0000368 DEGREES NORTH LATITUDE, 135.00001 75268 16 DEGREES EAST LONGITUDE |

| COORDINATE NUMBER j | AUTOMATIC DRIVING TRACK |
|---|---|
| 1 | 35.0000009 DEGREES NORTH LATITUDE, 135.0000016796532 DEGREES EAST LONGITUDE |
| 2 | 35.0000099 DEGREES NORTH LATITUDE, 135.0000016796532 DEGREES EAST LONGITUDE |
| 3 | 35.0000189 DEGREES NORTH LATITUDE, 135.0000016066248 DEGREES EAST LONGITUDE |
| 4 | 35.0000279 DEGREES NORTH LATITUDE, 135.0000015701106 DEGREES EAST LONGITUDE |
| 5 | 35.0000368 DEGREES NORTH LATITUDE, 135.0000015335964 DEGREES EAST LONGITUDE |

| ROAD ID | AUTOMATIC DRIVING TRACK COMPLETION DEGREE |
|---|---|
| 1 | 1 |
| 2 | 1 |
| 3 | 0 |
| 4 | 1 |
| 5 | 1 |
| 6 | 1 |
| 7 | 1 |
| 8 | 0.67 |
| 9 | 1 |
| 10 | 0.33 |
| 11 | 1 |
| 12 | 1 |
| 13 | 1 |
| 14 | 1 |

FIG. 20B

| ROAD ID | TRACK ACQUIRING INCENTIVE |
|---|---|
| 1 | 0 |
| 2 | 0 |
| 3 | 10 |
| 4 | 0 |
| 5 | 0 |
| 6 | 0 |
| 7 | 0 |
| 8 | 30 |
| 9 | 0 |
| 10 | 15 |
| 11 | 0 |
| 12 | 0 |
| 13 | 0 |
| 14 | 0 |

FIG. 25

MAXIMUM ACCELERATION RELIABILITY DETERMINATION TABLE (2601)

| MAXIMUM ACCELERATION $g_{max}$ [m/s²] (2602) | RELIABILITY (2603) |
|---|---|
| $0 \leq g_{max} < 2$ | 0.15 |
| $2 \leq g_{max} < 4$ | 0.05 |
| $g_{max} > 4$ | 0 |

MINIMUM ACCELERATION RELIABILITY DETERMINATION TABLE (2611)

| MINIMUM ACCELERATION $g_{min}$ [m/s²] (2612) | RELIABILITY (2613) |
|---|---|
| $-2 \leq g_{min} < 0$ | 0.15 |
| $-4 \leq g_{min} < -2$ | 0.05 |
| $-4 > g_{min}$ | 0 |

MAXIMUM SPEED RELIABILITY DETERMINATION TABLE (2621)

| MAXIMUM SPEED $v_{max}$ [km/h] (2622) | RELIABILITY (2623) |
|---|---|
| $v_{max} < 50$ | 0.15 |
| $50 \leq v_{max} < 60$ | 0.05 |
| $v_{max} > 60$ | 0 |

2502

INFORMATION PROCESSING APPARATUS AND AUTOMATIC DRIVING TRACK MANAGEMENT SYSTEM

CLAIM OF PRIORITY

The present application claims priority from Japanese patent application JP2018-015307 filed on Jan. 31, 2018, the content of which is hereby incorporated by reference into this application.

BACKGROUND OF THE INVENTION

1. Field of the Invention

The present invention relates to a map display method for a vehicle, and more particularly, to a map display method for completing an automatic driving track for an automatic driving vehicle.

2. Description of the Related Art

In recent years, in a vehicle field, the development of an automatic driving vehicle that automatically travels by performing traveling only by recognition and determination by a system itself in the vehicle has excessively increased. In order to perform a predetermined track following type automatic driving, it is necessary to acquire, in advance, an automatic driving track, which is a set of position information indicating which position on a road the vehicle is to pass through. In order to create the automatic driving track described above, it is necessary to acquire the position information by traveling of a vehicle in which a global positioning system (GPS) or the like, for acquiring a position coordinate is mounted. Since the automatic driving track is created for each road, in order to complete automatic driving tracks of all roads, it is necessary to travel a very long distance by the vehicle, such that it is difficult to complete more automatic driving tracks at an early stage.

JP 2003-203296 A discloses an in-vehicle terminal apparatus aimed to efficiently collect and transfer a traffic volume and a required traveling time of each road. The in-vehicle terminal apparatus includes a display means that displays a route requiring traveling history information (a combination of required traveling times of a road and a road), a means that collects traveling history information in the route displayed on the display means of a vehicle in which the in-vehicle terminal apparatus is mounted, and a providing means that provides the collected traveling history information. A user driving a vehicle equipped with the in-vehicle terminal apparatus disclosed in JP 2003-203296 A can recognize the route requiring the traveling history information, select a road requiring the traveling history information, and allow the vehicle to travel on the selected road. As a result, it is possible to collect traveling history information of many roads at an early stage from traveling history information of a large number of users driving the vehicles equipped with the in-vehicle terminal apparatus.

SUMMARY OF THE INVENTION

However, traveling history information and a position information group required for creating the automatic driving track are different from each other. Specifically, in order to create the automatic driving track, a coordinate group of traveling tracks acquired at a sufficiently short interval is required. In addition, in order to create an automatic driving track with a sufficient precision, a coordinate group obtained by performing traveling plural times may be required. For this reason, even in the case where a route requiring traveling history information is displayed and the user allows a vehicle to travel on the route requiring the traveling history information, it is not possible to complete automatic driving tracks of more roads at an early stage.

To solve the above problem, according to the present invention, there is provided an information processing apparatus including: a processor; a storage device that is connected to the processor; a display apparatus that is connected to the processor; and a communication apparatus that is connected to the processor and communicates with a server apparatus, the storage device holds map information indicating a connection relationship between roads, when the processor receives information indicating a completion degree of automatic driving track information including coordinate values of a traveling track when a vehicle travels on each road by automatic driving from the server apparatus through the communication apparatus, the processor holds the information indicating the completion degree in the storage device, and the display apparatus displays a map including the roads based on the map information, and superimposes and displays information indicating the completion degree calculated for each of the roads on the map.

According to one embodiment of the present invention, a user can select a road of which an automatic driving track is not completed with reference to an automatic driving track completion degree and drive an automatic driving vehicle on the selected road, such that it is possible to complete automatic driving tracks of more roads at an early stage.

Objects, configurations, and effects other than those described above will be clarified from a description of embodiments provided below.

BRIEF DESCRIPTION OF THE DRAWINGS

FIG. 5 is an explanatory diagram showing a node table corresponding to the example of the connection relationship between the roads that become the targets for creating the automatic driving track in the first embodiment of the present invention;

FIG. 7 is an explanatory diagram showing an example of an automatic driving track DB according to the first embodiment of the present invention;

FIG. 16 is an explanatory diagram showing an example of a plurality of traveling tracks acquired in the first embodiment of the present invention;

FIG. 17 is an explanatory diagram showing an example of an automatic driving track generated from the plurality of traveling tracks acquired in the first embodiment of the present invention;

FIGS. 20A and 20B are explanatory diagrams showing an example of a configuration of a track acquiring incentive DB according to the second embodiment of the present invention;

FIG. 25 is an explanatory diagram showing an example of a traveling track reliability determination table according to the third embodiment of the present invention;

DESCRIPTION OF THE PREFERRED EMBODIMENTS

Hereinafter, each embodiment will be described with reference to the drawings. First, a configuration of a system in each embodiment described below will be described with reference to FIG. 1.

Figure 1:
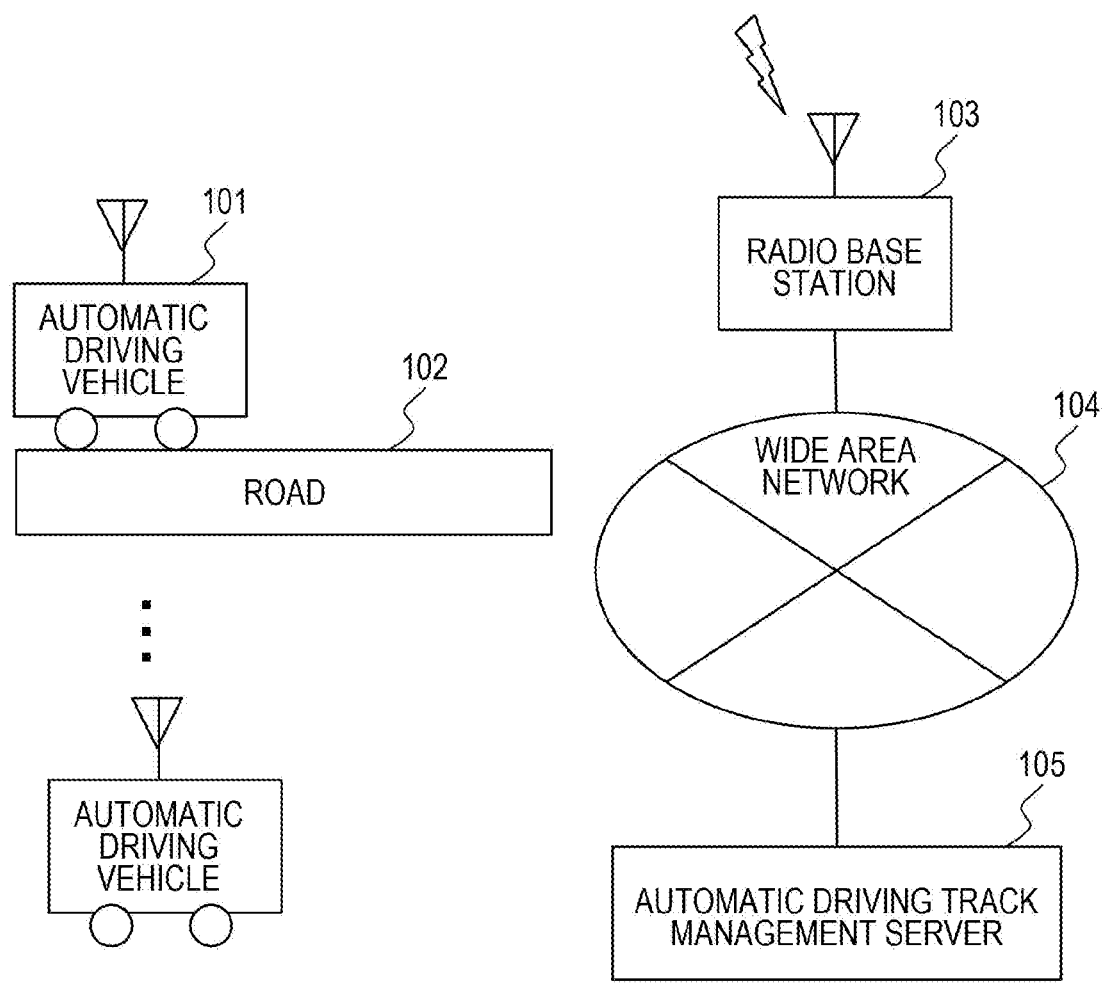
FIG. 1 is an explanatory diagram showing a configuration of a system according to an embodiment of the present invention.

FIG. 1 is an explanatory diagram showing a configuration of a system according to an embodiment of the present invention.

The system according to the embodiment of the present invention includes an automatic driving vehicle 101, a radio base station 103, a wide area network 104, and an automatic driving track management server 105. The automatic driving vehicle 101 travels on a road 102, and transmits and receives data to and from the automatic driving track management server 105 through the radio base station 103 and the wide area network 104, if necessary.

First Embodiment

A first embodiment of the present invention will be described with reference to FIGS. 2 to 18.

Figure 2:
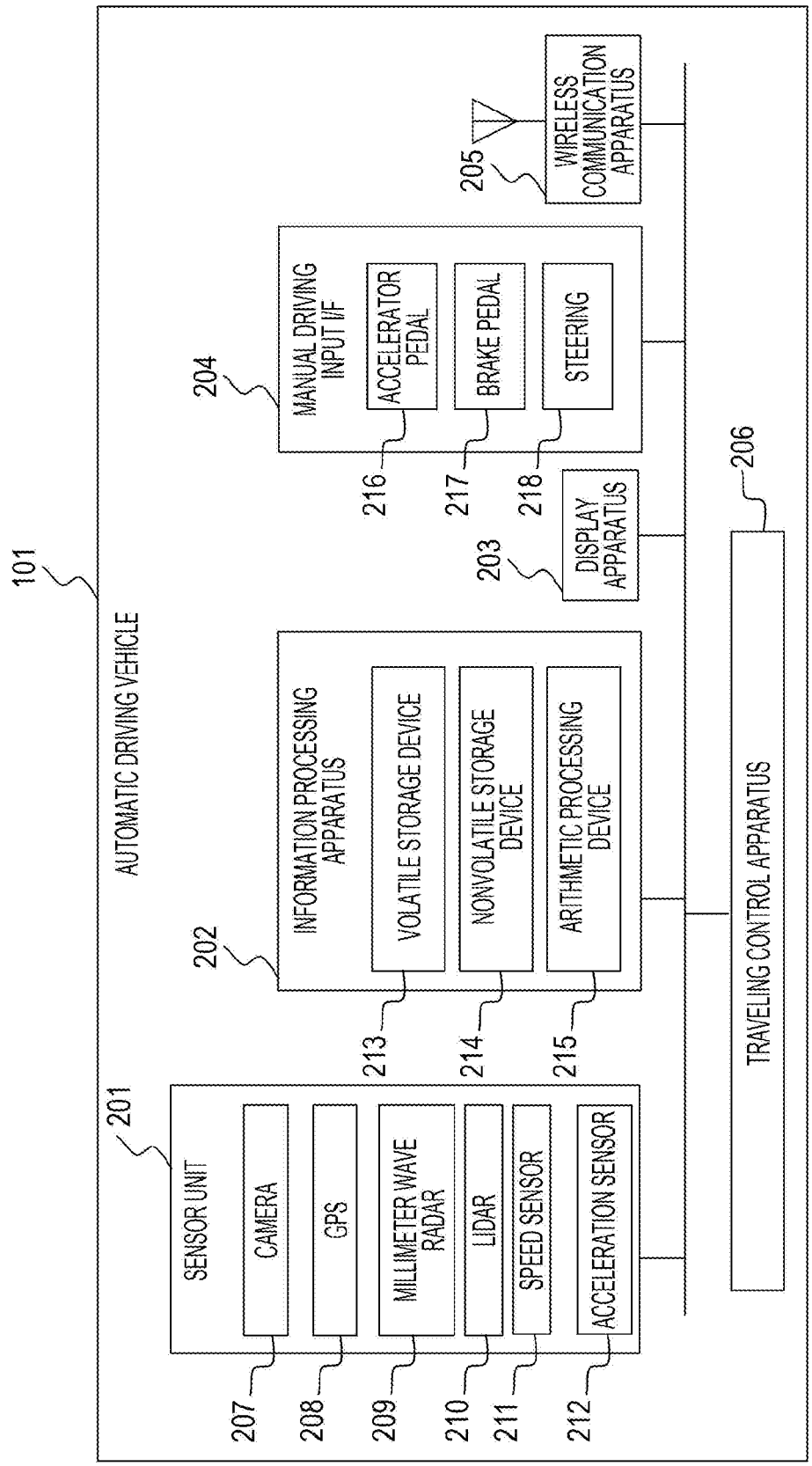
FIG. 2 is a block diagram showing a hardware configuration of an automatic driving vehicle according to a first embodiment of the present invention.

FIG. 2 is a block diagram showing a hardware configuration of the automatic driving vehicle 101 according to the first embodiment of the present invention.

The automatic driving vehicle 101 includes a sensor unit 201, an information processing apparatus 202, a display apparatus 203, a manual driving input interface (I/F) 204, a wireless communication apparatus 205, and a traveling control apparatus 206.

The sensor unit 201 is used for the automatic driving vehicle 101 to recognize a state of an own vehicle and a situation around the own vehicle. The sensor unit 201 includes a camera 207 for acquiring an image around the own vehicle, a global positioning system (GPS) 208 for acquiring position information of the own vehicle, a millimeter wave radar 209 for measuring a distance to an object around the own vehicle, a shape of the object and the like, a light detection and ranging (LIDAR) 210, a speed sensor 211 for measuring a speed of the own vehicle, and an acceleration sensor 212 for measuring an acceleration of the own vehicle.

The information processing apparatus 202 includes a volatile storage device 213, a nonvolatile storage device 214, and an arithmetic processing device 215. The volatile storage device 213 is a storage device such as a dynamic random access memory (DRAM), and temporarily holds programs and data. The nonvolatile storage device 214 is a storage device such as a hard disk drive or a flash memory, and is a device for holding programs and data in the long term. The arithmetic processing device 215 is a processor that executes reading of the data stored in the volatile storage device 213 or the nonvolatile storage device 214, arithmetic operation based on the programs stored in the volatile storage device 213 or the nonvolatile storage device 214, and the like.

The display apparatus 203 is an apparatus for providing information to a user who rides in the automatic driving vehicle 101.

The manual driving input I/F 204 is an interface for the user to manually control the automatic driving vehicle 101.

The manual driving input I/F 204 includes an accelerator pedal 216 for performing acceleration, a brake pedal 217 for performing deceleration, and a steering 218 for performing steering.

The wireless communication apparatus 205 is an apparatus for transmitting and receiving data to and from the automatic driving track management server 105 through the radio base station 103 and the wide area network 104.

Figure 3:
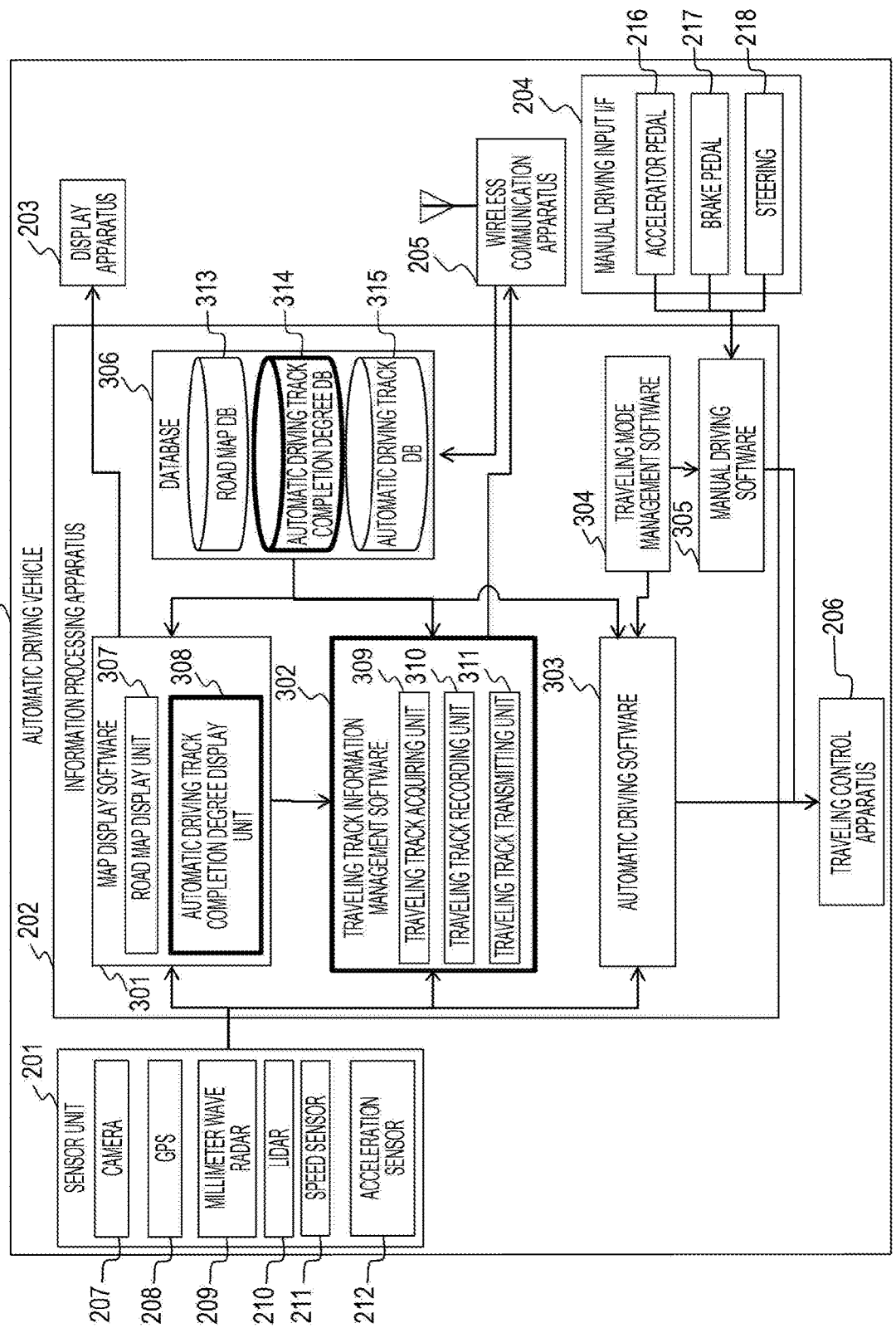
FIG. 3 is a block diagram showing a software configuration of the automatic driving vehicle according to the first embodiment of the present invention.

FIG. 3 is a block diagram showing a software configuration of the automatic driving vehicle 101 according to the first embodiment of the present invention.

In the information processing apparatus 202, map display software 301, traveling track information management software 302, automatic driving software 303, traveling mode management software 304, and manual driving software 305 are executed. Data are read from each of the software described above and are written into a database 306 in the information processing apparatus 202.

The database 306 includes a road map database (DB) 313, an automatic driving track completion degree DB 314, and an automatic driving track DB 315. The road map DB 313 is a DB in which a connection relationship between roads is recorded. The automatic driving track completion degree DB 314 is a DB in which an automatic driving track completion degree of the road is stored. The automatic driving track completion degree indicates a completion degree of the automatic driving track information required when the automatic driving vehicle travels on the road by automatic driving. The automatic driving track DB 315 is a DB in which automatic driving tracks (including at least coordinate values of a track on which the automatic driving vehicle 101 travels by automatic driving) required for the automatic driving vehicle 101 to travel on the road 102 by the automatic driving are recorded.

The map display software 301 includes a road map display unit 307 and an automatic driving track completion degree display unit 308. The road map display unit 307 reads and displays a road map around a current position of the own vehicle in the road map DB 313 based on current position information acquired from the GPS 208. The automatic driving track completion degree display unit 308 superimposes and displays automatic driving track completion degree information on the road map displayed by the road map display unit 307 with reference to the automatic driving track completion degree DB 315.

The traveling mode management software 304 determines a traveling mode of the automatic driving vehicle 101, and notifies the automatic driving software 303 or the manual driving software 305 of the determined traveling mode. The manual driving software 305 allows the automatic driving vehicle 101 to travel by transmitting control signals input from the accelerator pedal 216, the brake pedal 217, and the steering 218 to the traveling control apparatus. The automatic driving software 303 reads an automatic driving track around the current position among the automatic driving tracks recorded in the automatic driving track DB 315 based on the current position information input from the GPS 208, generates a control signal so that automatic driving vehicle 101 travels on the read automatic driving track, and inputs the generated control signal to the traveling control apparatus 206.

The traveling track information management software 302 includes a traveling track acquiring unit 309, a traveling track recording unit 310, and a traveling track transmitting unit 311. The traveling track acquiring unit 309 periodically acquires the current position information from the GPS 208 when the automatic driving vehicle 101 is traveling by manual driving. The traveling track recording unit 310 records a series of current position information acquired by the traveling track acquiring unit 309 as a traveling track. The traveling track acquiring unit 309 may also acquire speed information from the speed sensor 211, in addition to the position information, and the traveling track recording unit 310 may record the series of current position information and the speed information as the traveling track. This speed information can be used to control the automatic driving vehicle 101 that travels on an automatic driving track by automatic driving when the automatic driving track is created based on the traveling track.

The traveling track transmitting unit 311 transmits the traveling track recorded by the traveling track recording unit to the automatic driving track management server 105 through the wireless communication apparatus 205.

The database 306 is stored in the volatile storage device 213 or the nonvolatile storage device 214 of the information processing apparatus 202. For example, the database 306 may be stored in the nonvolatile storage device 214, and at least a portion of the database 306 may be copied to the volatile storage device 213, if necessary.

The map display software 301, the traveling track information management software 302, the automatic driving software 303, the traveling mode management software 304, and the manual driving software 305 described above are programs that are stored in the volatile storage device 213 or the nonvolatile storage device 214 of the information processing apparatus 202. Functions of each of the software described above are realized by the arithmetic processing device 215 executing the programs. Therefore, processing based on each of the software described in the following description is actually executed by the arithmetic processing device 215.

The information processing apparatus 202 described above may be any type of apparatus as long as it is mounted in the automatic driving vehicle 101 and has functions described in detail below. Here, the information processing apparatus 202 mounted in the automatic driving vehicle 101 may be installed in the automatic driving vehicle 101 or may be carried by the user who rides in the automatic driving vehicle 101, as long as it is moved together with the automatic driving vehicle 101. For example, the information processing apparatus 202 may be a terminal apparatus (for example, a navigation apparatus) installed in the automatic driving vehicle 101 or may be a portable information terminal (for example, a smartphone) carried by the user who rides in the automatic driving vehicle 101. In addition, the sensor unit 201 may be installed in the automatic driving vehicle 101, or at least some (for example, the GPS 208) of the sensor unit 201 may be included in the information processing apparatus 202.

It should be noted that a plurality of automatic driving vehicles 101 may be present in the system shown in FIG. 1. In FIGS. 2 and 3, the automatic driving vehicle 101 capable of performing both of the automatic driving and the manual driving by the user is illustrated, but this is an example of the vehicle constituting the present embodiment. Actually, some of the plurality of automatic driving vehicles 101 may be replaced by manual driving vehicles that do not have an automatic driving function, or some others of the plurality of automatic driving vehicles 101 may not have a manual driving function.

Specifically, as described below, the automatic driving vehicle 101 that displays information on the automatic driving track completion degree and travels on the road by the manual driving to transmit information on a track on which it travels may be replaced by the manual driving vehicle that does not have the automatic driving function. In addition, the automatic driving vehicle 101 that receives information of the automatic driving track DB from the automatic driving track management server 105 and performs the automatic driving based on the received information may not have the manual driving function.

Figure 4:
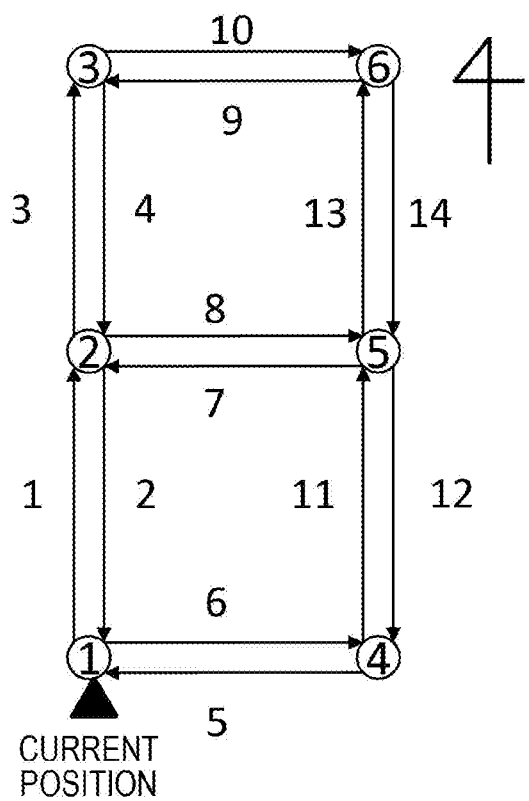
FIG. 4 is an explanatory diagram showing an example of a connection relationship between roads that become targets for creating an automatic driving track in the first embodiment of the present invention.
Figure 6:
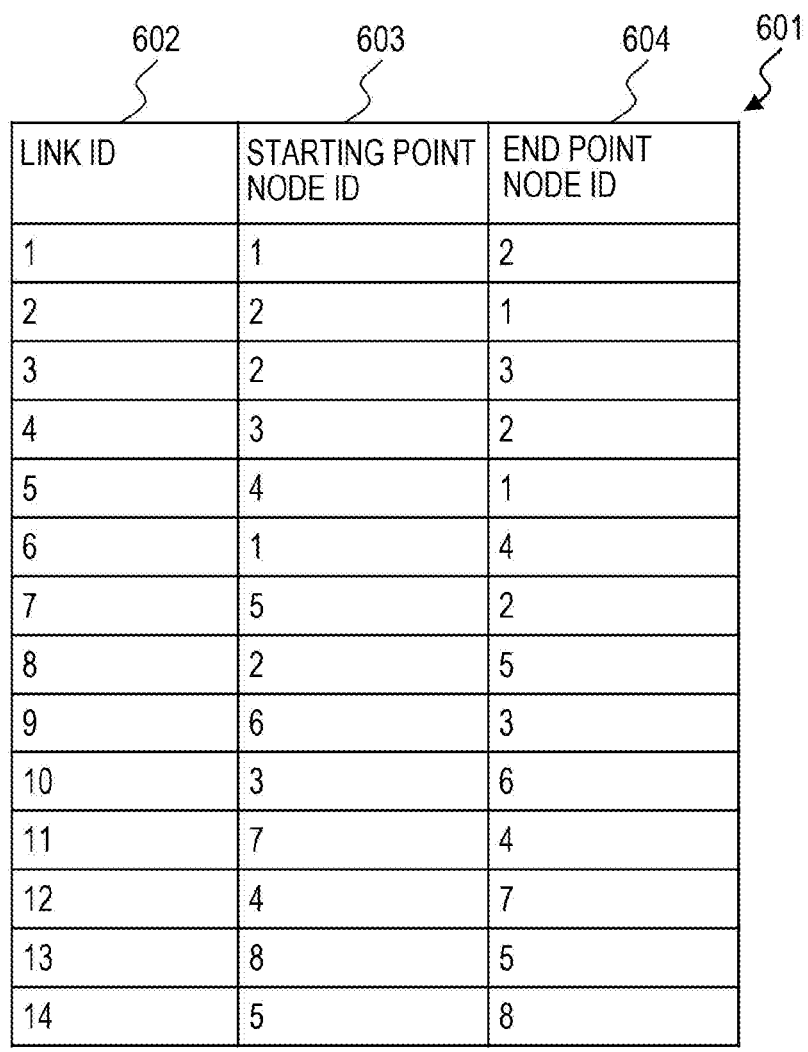
FIG. 6 is an explanatory diagram showing a link table corresponding to the example of the connection relationship between the roads that become the targets for creating the automatic driving track in the first embodiment of the present invention.

Next, an example of a configuration of the road map DB 313 will be described with reference to FIGS. 4 to 6. FIG. 4 is an explanatory diagram showing an example of a connection relationship between roads that become targets for creating an automatic driving track in the first embodiment of the present invention. FIGS. 5 and 6 are explanatory diagrams of a node table and a link table corresponding to the example of the connection relationship between the roads shown in FIG. 4.

Circles shown in FIG. 4 refer to nodes corresponding to intersection points. Numbers (1 to 6 in the example of FIG. 4) described on the circles are node IDs for identifying each node.

Arrows connecting the circles to each other refer to links corresponding to roads connecting the intersection points to each other. Directions of the arrows refer to advancing directions of the vehicle at each link. Numbers (1 to 14 in the example of FIG. 4) displayed beside each arrow are link IDs for identifying each link.

The road map DB 313 includes a node table 501 shown in FIG. 5 and a link table 601 shown in FIG. 6. As shown in FIG. 5, the node table 501 includes a node ID 502 for identifying each node, and a latitude 503 and a longitude 504 which are position information of each node. For example, a node identified by a node ID: 1 (hereinafter also simply referred to as Node 1. The same goes for the other nodes) is located at 35.000000 degrees north latitude and 135.000000 degrees east longitude. Node 2 is located at 35.008988 degrees north latitude and 135.000000 degrees east longitude.

The node table 501 may further include a relative position x 505 indicating an x coordinate of a relative position from a node that becomes a reference to each node and a relative position y 506 indicating a y coordinate of the relative position. In FIG. 5, relative positions of each node from the Node 1 which is a current position of the vehicle are shown. In this example, an x-axis is a north direction and a y-axis is an east direction.

In addition, a distance corresponding to one degree latitude is 111,263.283 [m], and a latitude corresponding to 1 [m] is $8.98769093 \times 10^{-6}$ degrees. Similarly, a length of 1 second longitude at 35 degrees north latitude is 25.358 [m], and a longitude corresponding to 1 [m] is $1.095426 \times 10^{-5}$ degrees.

As shown in FIG. 6, the link table 601 includes a link ID 602 for identifying each link, a starting point node ID 603 for identifying a node of a starting point of each link, and an end point node ID 604 for identifying a node of an end point of each link. For example, a link identified by a link ID: 1 (hereinafter also simply referred to as Link 1. The same goes for the other links) refers to a road connecting the Node 1 (35.000000 degrees north latitude and 135.000000 degrees east longitude) and the Node 2 (35.008988 degrees north latitude and 135.000000 degrees east longitude) to each other and having an advance direction corresponding to a direction from the Node 1 to the Node 2.

FIG. 7 is an explanatory diagram showing an example of the automatic driving track DB 315 according to the first embodiment of the present invention.

The automatic driving track DB 315 includes a link ID 701 and a coordinate group 702. A link for which the coordinate group 702 for the link ID 701 is not stored indicates that the automatic driving track is not completed. The coordinate group 702 represents a group of points constituting an automatic driving track from a starting point of the link toward an end point of the link.

Figure 8:
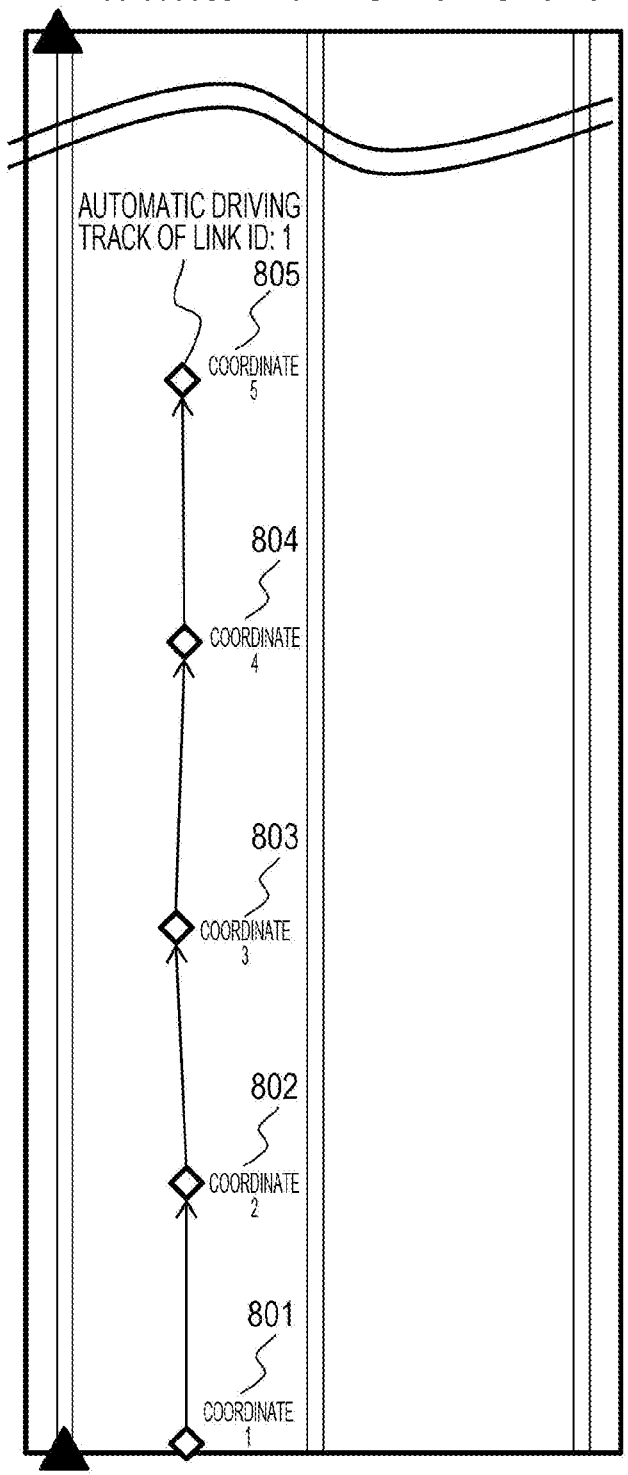
FIG. 8 is an explanatory diagram showing an example of an automatic driving track created in the first embodiment of the present invention.

FIG. 8 is an explanatory diagram showing an example of an automatic driving track created in the first embodiment of the present invention.

Specifically, FIG. 8 shows an automatic driving track of the Link 1 of the links illustrated in FIGS. 4 to 7. The Link 1 is a link from the Node 1 toward the Node 2, and latitudes and longitudes corresponding to Coordinate 1 801, Coordinate 2 802, Coordinate 3 803, Coordinate 4 804, and Coordinate 5 805 which are the automatic driving track of the Link 1 are stored in a corresponding place 703 of the automatic driving track DB 315.

Figure 9:
FIG. 9 is an explanatory diagram showing an example of an automatic driving track completion degree DB according to the first embodiment of the present invention.

FIG. 9 is an explanatory diagram showing an example of the automatic driving track completion degree DB 314 according to the first embodiment of the present invention.

The automatic driving track completion degree DB 314 includes a road ID 901, an automatic driving track completion degree 902, and the number of times of manual driving traveling 903. The automatic driving track completion degree 902 refers to a completion degree of the automatic driving track. The higher the value of the automatic driving track completion degree, the higher the completion degree, and the smaller the value of the automatic driving track completion degree, the lower the completion degree. The number of times of manual driving traveling 903 refers to the number of times of collection of tracks when the vehicle travels on the road by the manual driving. When the automatic driving track completion degree 902 is 1, it indicates that the automatic driving track of the road is completed.

In the example of FIG. 9, the automatic driving track completion degree 902 is 1 when the number of times of manual driving traveling 903 is 3. That is, whenever the number of times of manual driving traveling 903 is increased by 1, the automatic driving track completion degree 902 is increased by ⅓. This indicates that it is determined that information of traveling tracks obtained by three-time traveling is required in order to create an automatic driving track with a desired precision. That is, the automatic driving track completion degree 902 is calculated by calculating a ratio of an amount of information of the traveling tracks that have been already acquired to an amount of information of the traveling tracks determined to be required in order to create the automatic driving track, for each road.

A method of calculating the automatic driving track completion degree 902 as described above is an example, and the automatic driving track completion degree 902 may be calculated by other methods. For example, the number of times of manual driving traveling 903 required for the automatic driving track completion degree 902 to be 1 (that is, a value indicating that the automatic driving track is completed) may be a value other than 3. For example, the required number of times of manual driving traveling may be more than 3, and when a track with a sufficiently good precision by one-time manual driving traveling can be obtained, the automatic driving track completion degree 902 may be 1 by one-time manual driving traveling. In addition, the automatic driving track completion degree 902 may be calculated based on a value other than the number of times of manual driving traveling 903.

The automatic driving track completion degree DB 314 may further include an incentive 904. This will be described in a second embodiment (see a track acquiring incentive 2102 in FIG. 20B).

Figure 10:
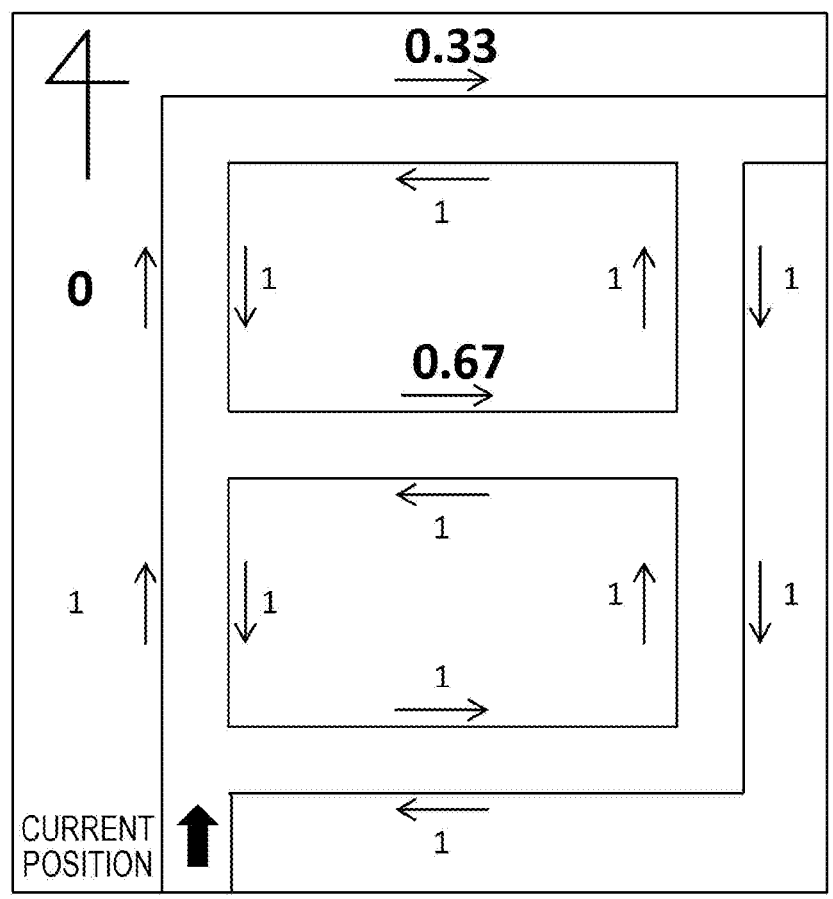
FIG. 10 is an explanatory diagram showing an example of displaying an automatic driving track completion degree on a display apparatus according to the first embodiment of the present invention.

FIG. 10 is an explanatory diagram showing an example of displaying an automatic driving track completion degree on the display apparatus 203 according to the first embodiment of the present invention.

The road map display unit 307 reads the node table 501 (FIG. 5) and the link table 601 (FIG. 6), and displays a road map of FIG. 10. Further, the road map display unit 307 reads the automatic driving track completion degree information corresponding to each link recorded in the automatic driving track completion degree DB 314 shown in FIG. 9, and superimposes and displays the automatic driving track completion degree information on road map information. "0", "0.33", "0.67", and "1" shown in FIG. 10 are the superimposed and displayed automatic driving track completion degree information. The user who rides in the automatic driving vehicle can recognize automatic driving track completion degrees of the surrounding roads, and selects a road of which an automatic driving track completion degree is not 1 and manually drives the automatic driving vehicle on the selected road, such that it is possible to complete the automatic driving tracks at an early stage.

Figure 11:
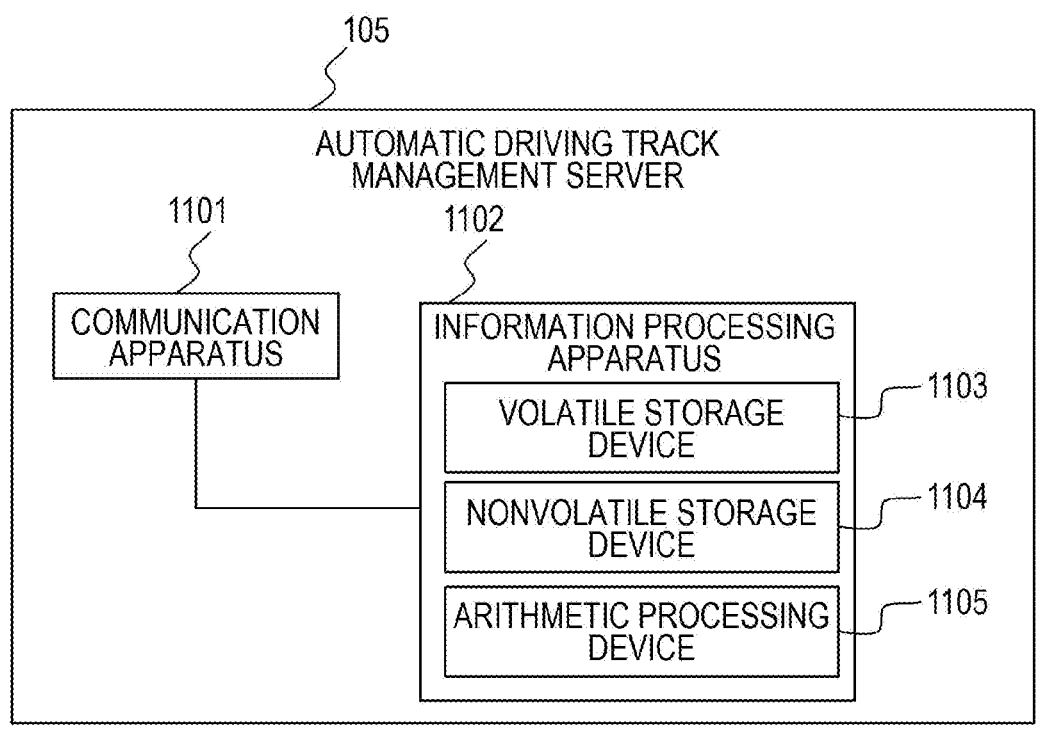
FIG. 11 is a block diagram showing a hardware configuration of an automatic driving track management server according to the first embodiment of the present invention.

FIG. 11 is a block diagram showing a hardware configuration of the automatic driving track management server 105 according to the first embodiment of the present invention.

The automatic driving track management server 105 includes a communication apparatus 1101 and an information processing apparatus 1102. The communication apparatus 1101 is an apparatus for communicating with the automatic driving vehicle 101 through the wide area network 104. The information processing apparatus 1102 includes a volatile storage device 1103, a nonvolatile storage device 1104, and an arithmetic processing device 1105. The volatile storage device 1103 is a storage device such as a DRAM, and temporarily holds programs and data. The nonvolatile storage device 1104 is a storage device such as a hard disk drive or a flash memory, and holds programs and data in the long term. The arithmetic processing device 1105 is a processor that executes reading of the data stored in the volatile storage device 1103 or the nonvolatile storage device 1104, arithmetic operation based on the programs stored in the volatile storage device 1103 or the nonvolatile storage device 1104, and the like.

Figure 12:
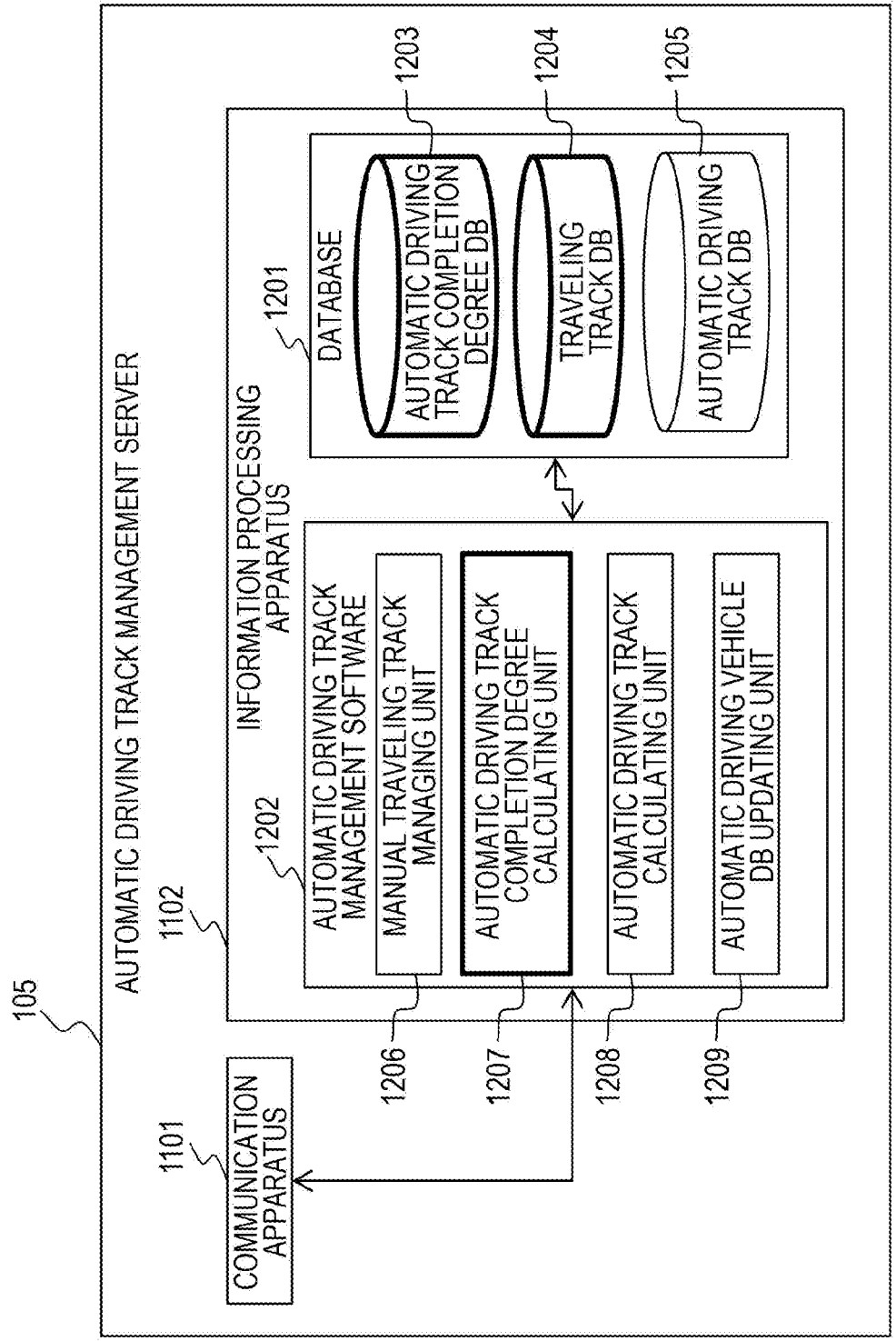
FIG. 12 is a block diagram showing a software configuration of the automatic driving track management server according to the first embodiment of the present invention.

FIG. 12 is a block diagram showing a software configuration of the automatic driving track management server 105 according to the first embodiment of the present invention.

A database 1201 includes an automatic driving track completion degree DB 1203, a traveling track DB 1204, and an automatic driving track DB 1205. The automatic driving track DB 1205 is the same as the automatic driving track DB 315 stored in the automatic driving vehicle 101. The traveling track DB 1204 is a database (DB) in which track information acquired when the automatic driving vehicle 101 travels on the road 102 by the manual driving is stored. The automatic driving track completion degree DB 1203 is the same as the automatic driving track completion degree DB 314 stored in the automatic driving vehicle 101.

Automatic driving track management software 1202 manages the database 1201 relating to the automatic driving. A manual traveling track managing unit 1206 receives a traveling track transmitted to the automatic driving track management server 105 when the automatic driving vehicle 101 travels on the road on which the automatic driving track is not generated by the manual operation, and stores the received traveling track in the traveling track DB 1204. An automatic driving track completion degree calculating unit 1207 calculates an automatic driving track completion degree of each road with reference to the traveling track DB 1204, and stores the calculated automatic driving track completion degree in the automatic driving track completion degree DB 1203.

An automatic driving track calculating unit 1208 reads traveling track information acquired when the automatic driving vehicle 101 travels by the manual driving with reference to the traveling track DB 1204, calculates an automatic driving track from the traveling track information, and stores the automatic driving track in the automatic driving track DB 1205. An automatic driving vehicle DB updating unit 1209 updates the automatic driving track completion degree DB 314 and the automatic driving track DB 315 of the automatic driving vehicle 101 by transmitting updated contents of the automatic driving track completion degree DB 1203 and the automatic driving track DB 1205 to the automatic driving vehicle 101 when the automatic driving track completion degree DB 1203 and the automatic driving track DB 1205 of the automatic driving track management server 105 are updated.

The database 1201 is stored in the volatile storage device 1103 or the nonvolatile storage device 1104 of the information processing apparatus 1102. For example, the database 1201 may be stored in the nonvolatile storage device 1104, and at least a portion of the database 1201 may be copied to the volatile storage device 1103, if necessary.

The automatic driving track management software 1202 described above is a program stored in the volatile storage device 1103 or the nonvolatile storage device 1104 of the information processing apparatus 1102. A function of the automatic driving track management software 1202 described above is realized by the arithmetic processing device 1105 executing the program. Therefore, processing based on the automatic driving track management software 1202 described in the following description is actually executed by the arithmetic processing device 1105.

A flow of operations of the automatic driving track management software 1202 will be described with reference to FIGS. 13 to 16.

Figure 13:
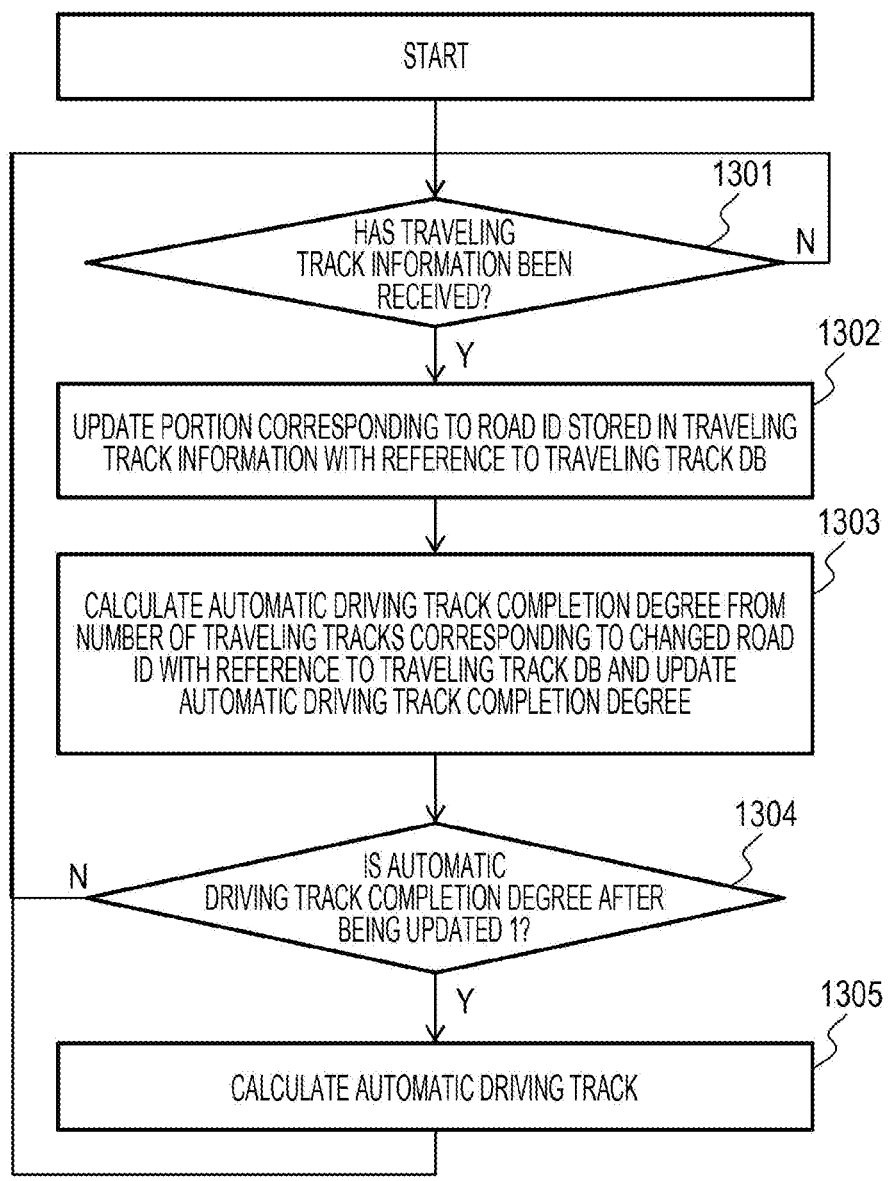
FIG. 13 is a flowchart showing operations of automatic driving track management software according to the first embodiment of the present invention.

FIG. 13 is a flowchart showing operations of the automatic driving track management software 1202 according to the first embodiment of the present invention.

The automatic driving track management software 1202 confirms whether or not the traveling track information has been received from the automatic driving vehicle 101 (1301) when an operation is started. The traveling track information includes a road ID and a track (coordinate group) when the automatic driving vehicle travels on the road. In step 1301, when the traveling track information has been received, a process proceeds to step 1302. In step 1301, when the traveling track information has not been received, the process again proceeds to step 1301.

In step 1302, the automatic driving track management software 1202 updates a portion corresponding to the road ID stored in the traveling track information with reference to the traveling track DB 1204, and the process proceeds to step 1303.

In step 1303, the automatic driving track management software 1202 calculates an automatic driving track completion degree from the number of traveling tracks corresponding to a changed road ID with reference to the traveling track DB 1204 and updates the automatic driving track completion degree in the automatic driving track completion degree DB 1203, and the process proceeds to step 1304.

In step 1304, the automatic driving track management software 1202 confirms whether or not the automatic driving track completion degree after being updated is 1. In step 1304, when the automatic driving track completion degree after being updated is 1, the process proceeds to step 1305. In step 1304, when the automatic driving track completion degree after being updated is not 1, the process proceeds to step 1301. In step 1305, the automatic driving track management software 1202 calculates an automatic driving track with reference to the traveling track DB 1204, and stores the calculated automatic driving track in the automatic driving track DB 1205.

Specific processing of steps 1302 and 1303 will be described with reference to FIGS. 14A and 14B.

Figure 14A:
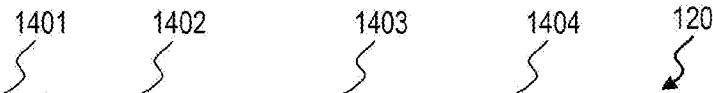
FIGS. 14A and 14B are explanatory diagrams showing examples of configurations of a traveling track DB and an automatic driving track completion degree DB according to the first embodiment of the present invention, respectively.
Figure 14B:
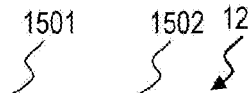

FIGS. 14A and 14B are explanatory diagrams showing examples of configurations of the traveling track DB 1204 and the automatic driving track completion degree DB 1203 according to the first embodiment of the present invention, respectively.

The traveling track DB 1204 includes a road ID 1401, a traveling track 1 1402, a traveling track 2 1403, and a traveling track 3 1404 (FIG. 14A). The road ID 1401 is an ID for identifying the road, and may be the same as the link ID. The traveling track 1 1402 to the traveling track 3 1404 are tracks (coordinate groups) acquired from the automatic driving vehicle 101 traveling by manual operation on the road identified by the road ID 1401, respectively.

The automatic driving track completion degree DB 1203 includes a road ID 1501 and an automatic driving track completion degree 1502 (FIG. 14B). The road ID 1401 is an ID for identifying the road, and corresponds to the road ID 1401 of the traveling track DB 1204. The automatic driving track completion degree 1502 is an index indicating a completion degree of an automatic driving track on the road identified by the road ID 1501. In the present embodiment, for each road, when the number of traveling tracks by manual operation, which needs to be acquired in order to generate the automatic driving track, is n, a value obtained by dividing the number of traveling tracks acquired from the automatic driving vehicle 101 actually traveling on the road by manual driving by n is held as the automatic driving track completion degree 1502. That is, the fact that the automatic driving track completion degree 1502 is 1 means that as many traveling tracks as the number required for generating the automatic driving track have been acquired for the road.

In step 1302, when a new traveling track for a road ID: 1 is received in a state in which a track is stored in the traveling track 1 and the traveling track 2 and is not stored in the traveling track 3 for the road ID: 1 of FIG. 14A, the automatic driving track management software 1202 stores the traveling track as the traveling track 3 1404 for a value "1" of the road ID 1401. Here, in the present description, it is assumed that the number n of traveling tracks by the manual operation required for generating the automatic driving track is 3.

As a result of step 1302, three actual traveling tracks are acquired with respect to the number (three) of traveling tracks required for generating the automatic driving track for the road ID: 1. For this reason, in step 1303, the automatic driving track completion degree 1502 is updated to 1 (=3/3). In step 1304, since the automatic driving track completion degree after the update of the road ID: 1 is determined to be 1, the automatic driving track is calculated in step 1305.

An example of a specific method of calculating the automatic driving track in step 1305 will be described with reference to FIGS. 15 to 17.

Figure 15:
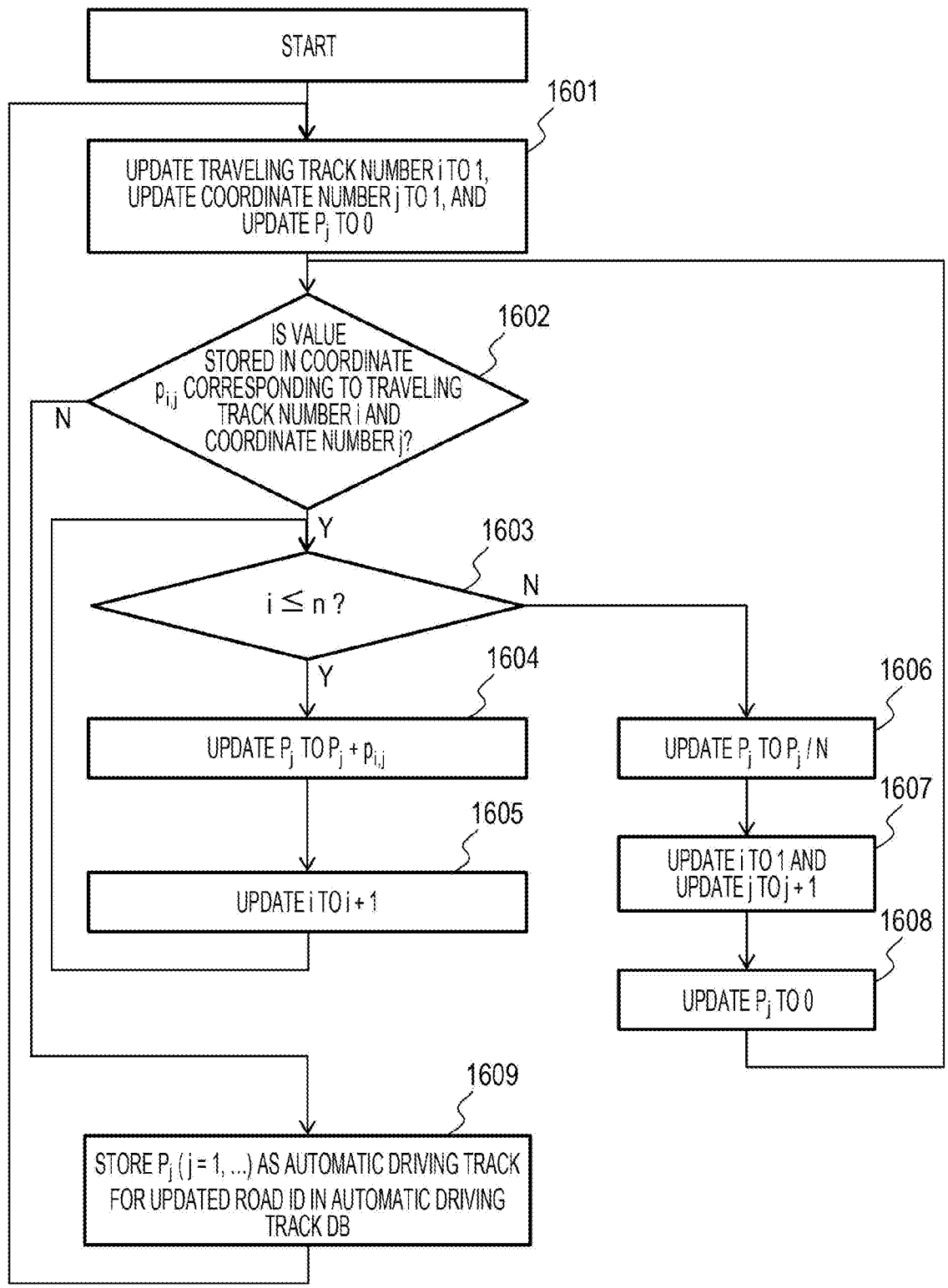
FIG. 15 is a flowchart showing operations of automatic driving track calculation according to the first embodiment of the present invention.

FIG. 15 is a flowchart showing operations of automatic driving track calculation (step 1305) according to the first embodiment of the present invention.

The definition of each variable in FIG. 15 is as follows. A traveling track number i is a number for identifying each traveling track acquired for a target road of automatic driving track generation. A coordinate number j is a number for identifying each coordinate of a traveling track including a plurality of coordinate groups. $p_{i,j}$ refers to a coordinate of the coordinate number j among coordinate point groups of the traveling track number i. n is the number of traveling tracks required for generating the automatic driving track, and n is 3 in this example. $P_j$ refers to a j-th coordinate in the automatic driving track generated from a plurality of traveling tracks.

In step 1601, the automatic driving track management software 1202 updates the traveling track number i to 1, updates the coordinate number j to 1, and updates $P_j$ to 0, and a process proceeds to step 1602. In step 1602, the automatic driving track management software 1202 confirms whether or not a value is stored in a coordinate $p_{i,j}$ corresponding to the traveling track number i and the coordinate number j. In step 1602, when the value is stored in $p_{i,j}$, the process proceeds to step 1603. In step 1602, when the value is not stored in $p_{i,j}$, the process proceeds to step 1609.

In step 1603, the automatic driving track management software 1202 confirms whether i is less than or equal to n. In step 1603, when i is less than or equal to n, the process proceeds step 1604. In step 1603, when i is not less than or equal to n, the process proceeds step 1606.

In step 1604, the automatic driving track management software 1202 updates $P_j$ to $P_j+p_{i,j}$, and the process proceeds to step 1605. In step 1605, the automatic driving track management software 1202 updates i to i+1, and the process proceeds to step 1603. In step 1606, the automatic driving track management software 1202 updates $P_j$ to $P_j/n$, and the process proceeds to step 1607. In step 1607, the automatic driving track management software 1202 updates i to 1 and updates j to j+1, and the process proceeds to step 1608. In step 1608, the automatic driving track management software 1202 updates $P_j$ to 0, and the process proceeds to step 1602. In step 1609, the automatic driving track management software 1202 stores $P_j$ as an automatic driving track for an updated road ID in the automatic driving track DB, and the process ends.

FIG. 16 is an explanatory diagram showing an example of a plurality of traveling tracks of the road ID: 1 acquired in the first embodiment of the present invention.

Specifically, in the example of FIG. 16, a series of coordinate values (coordinate group) corresponding to a traveling track 1 (i=1) corresponds to a series of coordinate values (coordinate group) stored as the traveling track 1 1402 corresponding to the road ID: 1 shown in FIG. 14A. Likewise, a series of coordinate values corresponding to a traveling track 2 (i=2) and a traveling track 3 (i=3) correspond to a series of coordinate values stored as the traveling track 2 1403 and the traveling track 3 1404 corresponding to the road ID: 2 and the road ID: 3 shown in FIG. 14A, respectively.

A coordinate number j is a number for identifying each coordinate value included in each traveling track, and may be attached in a sequence acquired in each traveling track, for example.

The above example is an example in which the automatic driving vehicle 101 travels three times on a road of the road ID: 1 by manual driving, and coordinate groups acquired at the time of each traveling are recorded as the traveling track 1 (i=1), the traveling track 2 (i=2) and the traveling track 3 (i=3). In this case, the three-time traveling may be performed by the same automatic driving vehicle 101 or may be performed by different automatic driving vehicles 101.

FIG. 17 is an explanatory diagram showing an example of an automatic driving track generated from the plurality of traveling tracks acquired in the first embodiment of the present invention.

Specifically, the example of FIG. 17 shows a series of coordinate values of the automatic driving track calculated from the coordinate values of the three traveling tracks shown in FIG. 16. For example, an automatic driving track 1801 corresponding to a coordinate number: 1 is a coordinate value of an automatic driving track calculated from a coordinate value 1701 of a traveling track 1 (i=1), a coordinate value 1702 of a traveling track 2 (i=2), and a coordinate value 1703 of a traveling track 3 (i=3) corresponding to a coordinate number: 1 shown in FIG. 16.

Figure 18:
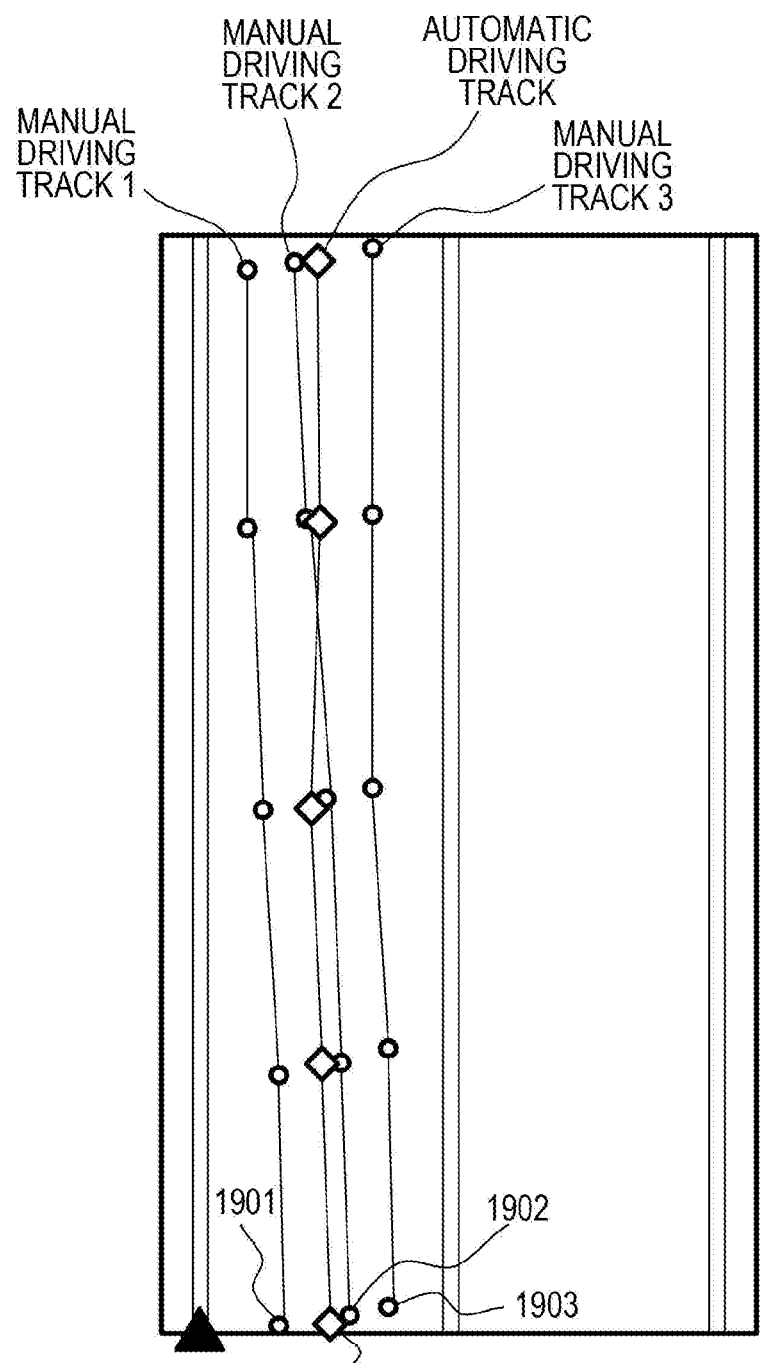
FIG. 18 is an explanatory diagram showing an example of mapping the plurality of traveling tracks acquired in the first embodiment of the present invention and the automatic driving track generated based on the plurality of traveling tracks onto a road.

FIG. 18 is an explanatory diagram showing an example of mapping the plurality of traveling tracks acquired in the first embodiment of the present invention and the automatic driving track generated based on the plurality of traveling tracks onto a road. Specifically, FIG. 18 shows an example of mapping the plurality of traveling tracks of the road ID: 1 shown in FIG. 16 and the automatic driving track of the road ID: 1 generated based on the plurality of traveling tracks and shown in FIG. 17 on the road of the road ID: 1.

In the flowchart of FIG. 15, the automatic driving track management software 1202 calculates the center of gravity of point groups having the same coordinate number among the respective traveling tracks, and stores them as coordinates of the same coordinate number of the automatic driving track. For example, a result of calculating the center of gravity of three points $p_{1,1}$ 1701, $p_{2,1}$ 1702, and $p_{3,1}$ 1703 on each traveling track relating to the road ID: 1 is $P_1$ 1801 on the automatic driving track. $p_{1,1}$ 1701, $p_{2,1}$ 1702, $p_{3,1}$ 1703, and $P_1$ 1801 correspond to coordinates 1901, 1902, 1903 and 1904 of FIG. 18, respectively.

Functions of the automatic driving vehicle 101 and the automatic driving track management server 105 are not necessarily disposed as described above. For example, the automatic driving track completion degree calculating unit 1207 and the automatic driving track calculating unit 1208 are disposed in the automatic driving track management server 105 in the above description, but the automatic driving track completion degree calculating unit 1207 and the automatic driving track calculating unit 1208 may also be disposed in the automatic driving vehicle 101. In other words, programs for realizing these functions may be stored in the volatile storage device 213 or the like, in the information processing apparatus 202 of the automatic driving vehicle 101, and be executed by the arithmetic processing device 215.

In addition, the functions of the automatic driving vehicle 101 and the automatic driving track management server 105 in the above description may be installed in another apparatus. For example, the map display software 301, the database 306, and the display apparatus 203 for informing the user of the automatic driving track completion degree may be disposed in an information terminal apparatus (for example, a smartphone) used by the user who rides in the automatic driving vehicle 101.

According to the present embodiment, the user can recognize the completion degree of the automatic driving track, such that it is possible to complete the automatic driving tracks of more roads at an early stage.

Second Embodiment

A second embodiment of the present invention will be described with reference to FIGS. 19 to 22. Since the respective portions of a system according to a second embodiment have the same functions as those of the respective portions denoted by the same reference numerals as those of the first embodiment except for differences described below, a description thereof will be omitted.

In the present embodiment, configurations of an automatic driving vehicle 101 and an automatic driving track management server 105 are different from those of the first embodiment.

Figure 19:
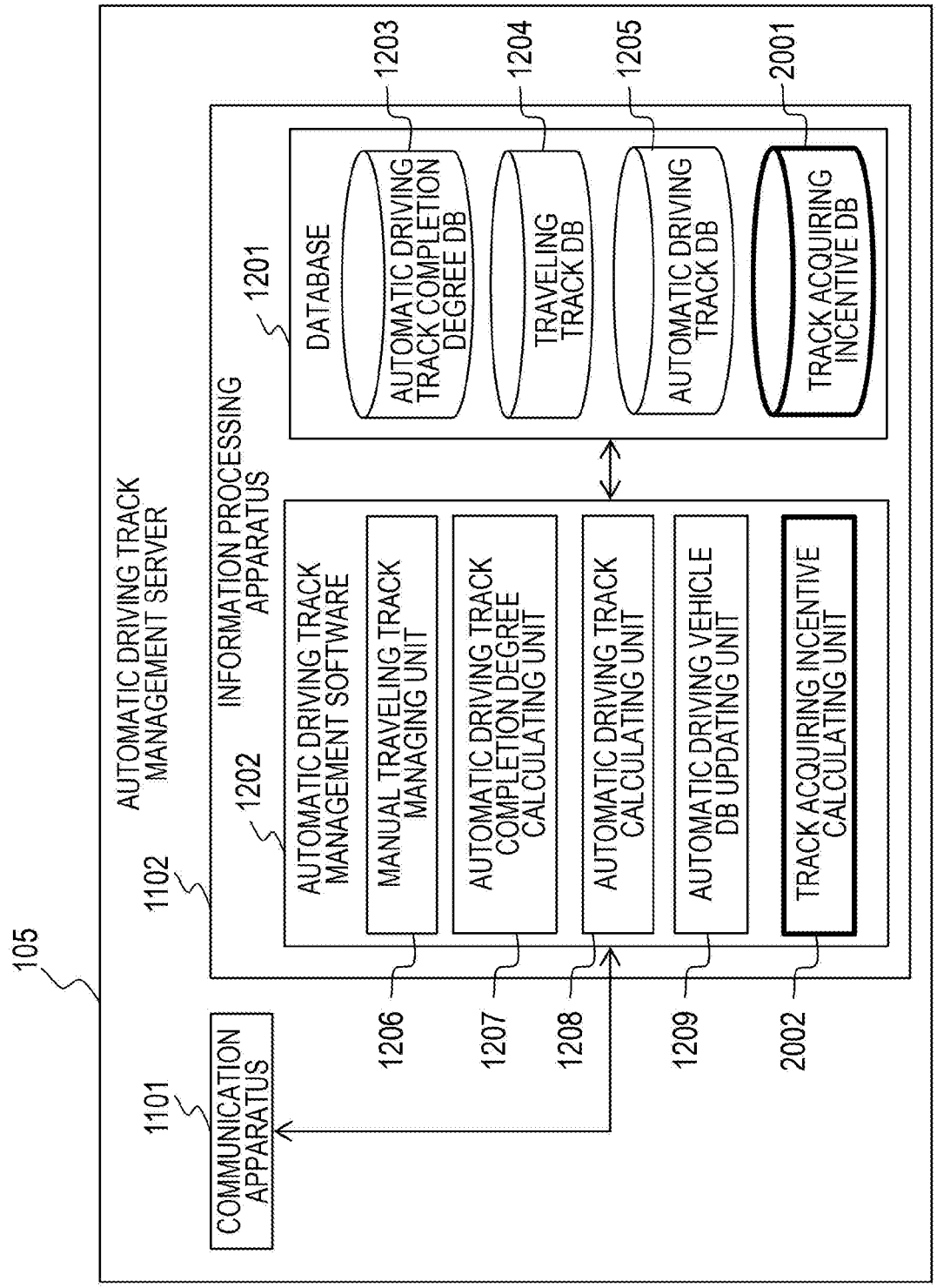
FIG. 19 is a block diagram showing a software configuration of an automatic driving track management server according to a second embodiment of the present invention.

FIG. 19 is a block diagram showing a software configuration of the automatic driving track management server 105 according to the second embodiment of the present invention.

A database 1201 of the automatic driving track management server 105 according to the second embodiment further includes a track acquiring incentive DB 2001, in addition to the DB included in the database 1201 (FIG. 12) according to the first embodiment. The track acquiring incentive DB 2001 is a DB in which incentives acquired by a user when the user allows the automatic driving vehicle 101 to travel by manual driving on each road are recorded.

In addition, automatic driving track management software 1202 of the automatic driving track management server 105 according to the second embodiment further includes a track acquiring incentive calculating unit 2002. The track acquiring incentive calculating unit 2002 calculates a track acquiring incentive from an automatic driving track completion degree of each road with reference to an automatic driving track completion degree DB 1203, and stores the calculated track acquiring incentive in the track acquiring incentive DB 2001.

FIGS. 20A and 20B are explanatory diagrams showing an example of a configuration of the track acquiring incentive DB 2001 according to the second embodiment of the present invention.

Specifically, as an example, the track acquiring incentive DB 2001 in the case where the automatic driving track completion degree DB 1203 is as shown in FIG. 20A is shown in FIG. 20B. Here, the automatic driving track completion degree DB 1203 shown in FIG. 20A is the same as that shown in FIG. 14B.

The track acquiring incentive DB 2001 includes a road ID 2101 and a track acquiring incentive 2102. The road ID 2101 corresponds to a road ID 1501 of the automatic driving track completion degree DB 1203. Roads (road ID: 1, 2, 4, 5, 6, 7, 9, 11, 12, 13, and 14) of which automatic driving track completion degrees are 1 in FIG. 20A are roads of which automatic driving tracks are already generated and on which additional traveling is not necessary, such that track acquiring incentives 2102 corresponding to these roads become 0.

Roads of which automatic driving track completion degrees are less than 1 in FIG. 20A are roads of which automatic driving tracks are not generated, such that track acquiring incentives of these roads become values larger than 0. Road IDs: 3, 8, and 10 are roads of which automatic driving tracks are not generated, and the respective track acquiring incentives of the road IDs: 3, 8, and 10 become 10, 30, and 20.

The track acquiring incentive may be any incentive as long as it gives the user a merit (that is, an incentive for allowing the automatic driving vehicle to travel on a road by manual driving). The track acquiring incentive may be cash, a point that can be used for a specific service, or the like. For example, when the automatic driving vehicle 101 is a vehicle for a charged car sharing service, a charge discount made for the user may be the track acquiring incentive. In this case, a magnitude of the incentive may correspond to a level of a discount rate.

A calculation formula used for the track acquiring incentive calculating unit 2002 to study the incentive is 10/(1−automatic driving track completion degree). This calculation formula is only an example, and other calculation formulas may be used. As in the present calculation formula, it is possible to increase the roads of which the automatic driving tracks are generated at an early stage by making a magnitude of the incentive larger as an automatic driving track completion degree of a road becomes higher among the roads of which the automatic driving tracks are not generated.

For example, assuming that the user moves from a node of a node ID: 2 to a node of a node ID: 3, there are a route passing through a road (link) of a road ID: 3 and a route passing through roads of road IDs: 8, 13, and 9. In this case, since an incentive of the former route is 10 and an incentive of the latter route is 30, it is likely that the user who attaches importance to the incentive passes through the latter route. Since an automatic driving track completion degree 1502 of the road ID: 3 on the former route is 0, even though the user passes through the road this time, an automatic driving track is not completed. On the other hand, an automatic driving track completion degree 1502 of the road ID: 8 on the latter route is 0.67, and an automatic driving track is completed by traveling performed this time.

Figure 21:
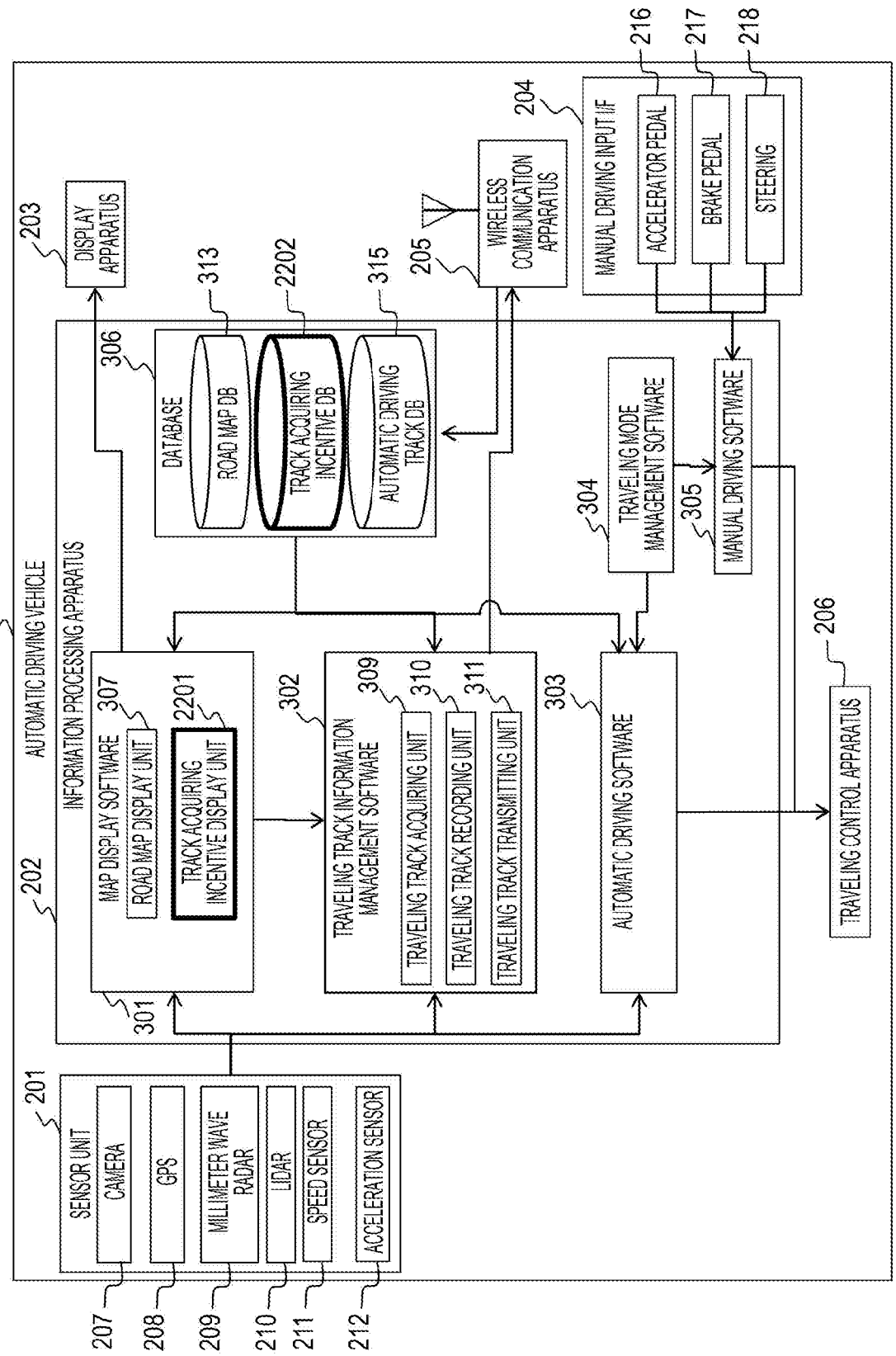
FIG. 21 is a block diagram showing a software configuration of an automatic driving vehicle according to the second embodiment of the present invention.

FIG. 21 is a block diagram showing a software configuration of the automatic driving vehicle 101 according to the second embodiment of the present invention.

A database 306 of the automatic driving vehicle 101 according to the second embodiment further includes a track acquiring incentive DB 2202, in addition to a road map DB 313 and an automatic driving track DB 315 included in the database 306 (FIG. 3) according to the first embodiment. The track acquiring incentive DB 2022 is a DB in which incentives when the automatic driving vehicle travels by manual driving on each road are recoded.

It should be noted that the database 306 according to the second embodiment does not include an automatic driving track completion degree DB 314 in an example of FIG. 21, but may also include the automatic driving track completion degree DB 314.

In addition, map display software 301 of the automatic driving vehicle 101 according to the second embodiment further includes a track acquiring incentive display unit 2201. The track acquiring incentive display unit 2201 superimposes and displays an incentive of each road on a road map displayed on a display apparatus 203 with reference to the track acquiring incentive DB 2202.

Figure 22:
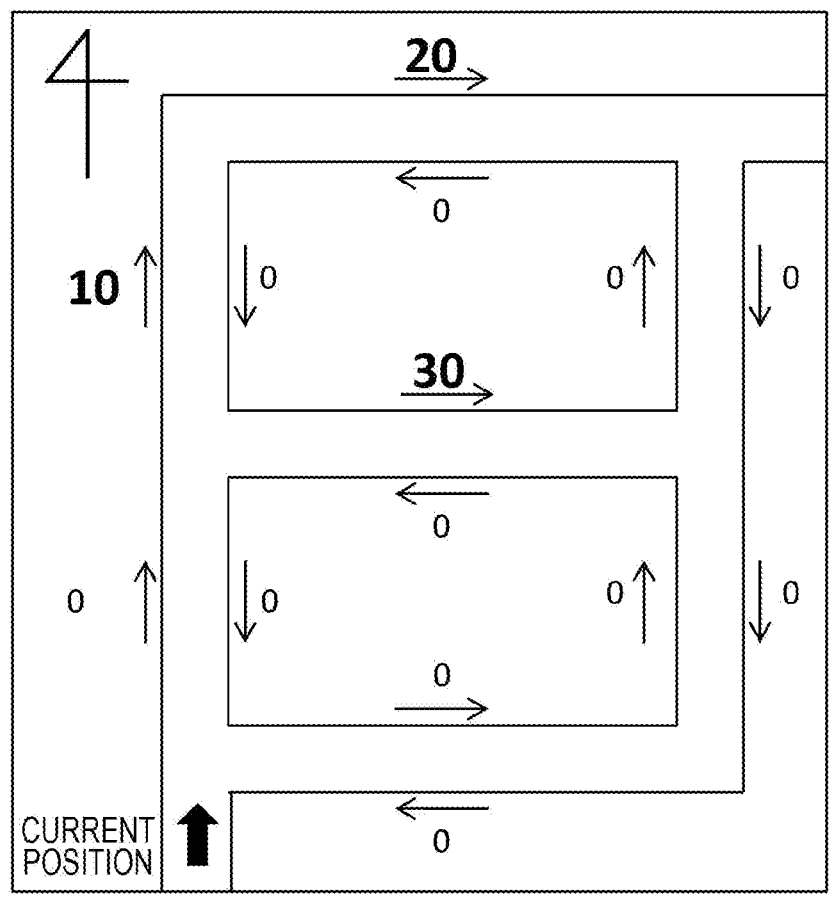
FIG. 22 is an explanatory diagram showing an example of displaying an incentive on a display apparatus according to the second embodiment of the present invention.

FIG. 22 is an explanatory diagram showing an example of displaying an incentive on the display apparatus 203 according to the second embodiment of the present invention.

A road map display unit 307 reads the node table 501 (FIG. 5) and the link table 601 (FIG. 6), and displays a road map of FIG. 22. Further, the track acquiring incentive display unit 2201 reads track acquiring incentives corresponding to each link recorded in the track acquiring incentive DB 2202 shown in FIG. 21, and superimposes and displays the track acquiring incentives on road map information. "0", "10", "20", and "30" shown in FIG. 22 are the superimposed and displayed track acquiring incentives. The user who rides in the automatic driving vehicle can recognize automatic driving track completion degrees of the surrounding roads, and selects a road having a track acquiring incentive and manually drives the automatic driving vehicle on the selected road, such that it is possible to complete the automatic driving tracks at an early stage.

Third Embodiment

A third embodiment of the present invention will be described with reference to FIGS. 23 to 25. Since the respective portions of a system according to a third embodiment have the same functions as those of the respective portions denoted by the same reference numerals as those of the first and second embodiments except for differences described below, a description thereof will be omitted.

In the present embodiment, configurations of an automatic driving vehicle 101 and an automatic driving track management server 105 are different from those of the first embodiment.

Figure 23:
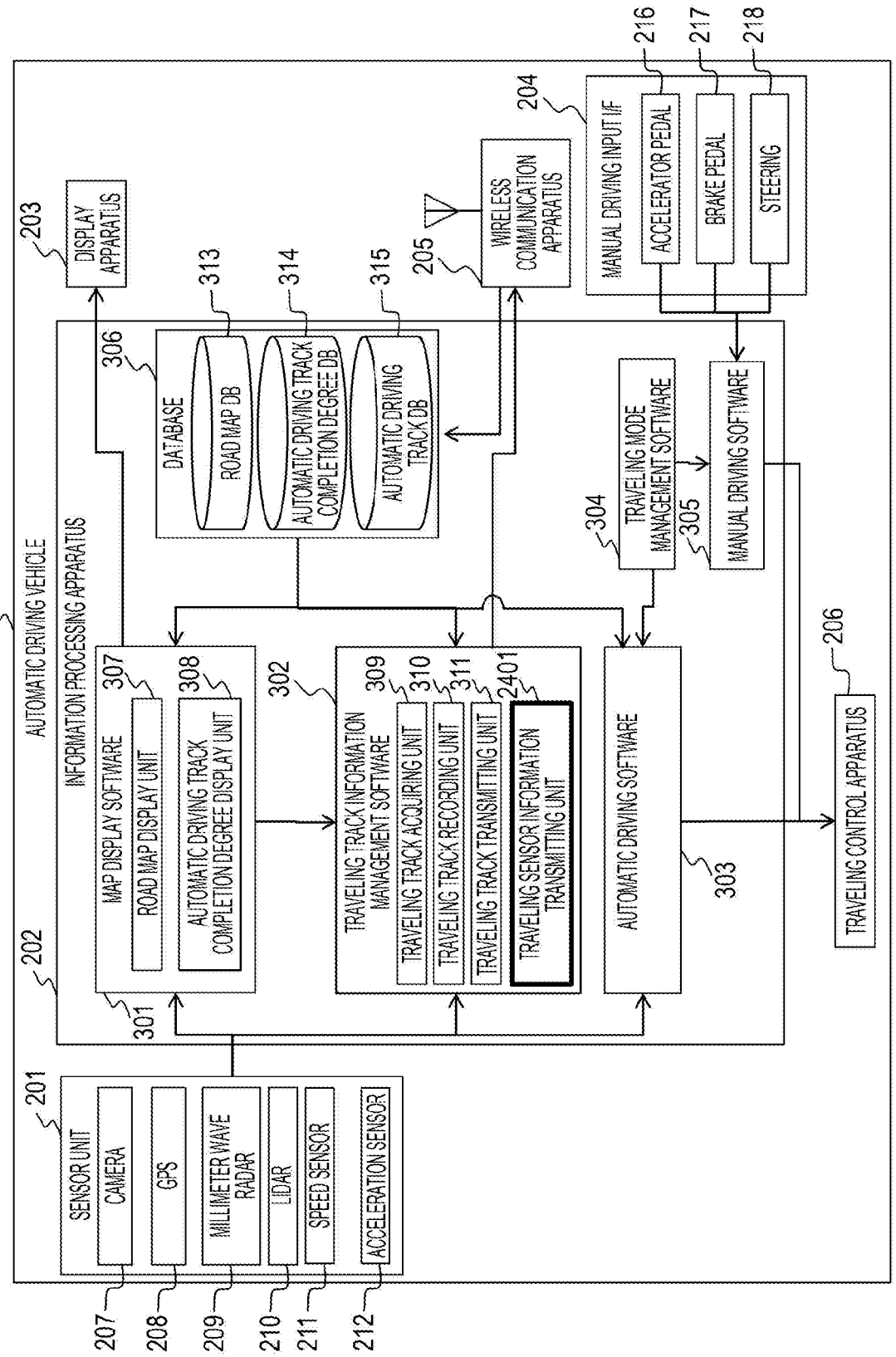
FIG. 23 is a block diagram showing a software configuration of an automatic driving vehicle according to a third embodiment of the present invention.

FIG. 23 is a block diagram showing a software configuration of the automatic driving vehicle 101 according to the third embodiment of the present invention.

Traveling track information management software 302 of the automatic driving vehicle 101 according to the third embodiment further includes a traveling sensor information transmitting unit 2401. The traveling sensor information transmitting unit 2401 records sensor values acquired from a sensor unit 201 at the time of manual driving, and transmits the sensor values to the automatic driving track management server through a wireless communication apparatus 205. Here, the acquired and transmitted sensor values are a maximum speed $v_{max}$ [km/h] acquired from a speed sensor 211, and a minimum acceleration $g_{min}$ [m/s$^2$] and a maximum acceleration $g_{max}$ [m/s$^2$] acquired from an acceleration sensor 212. These sensor values are only examples, and the traveling sensor information transmitting unit 2401 may transmit sensor values acquired from other sensors or the like.

Figure 24:
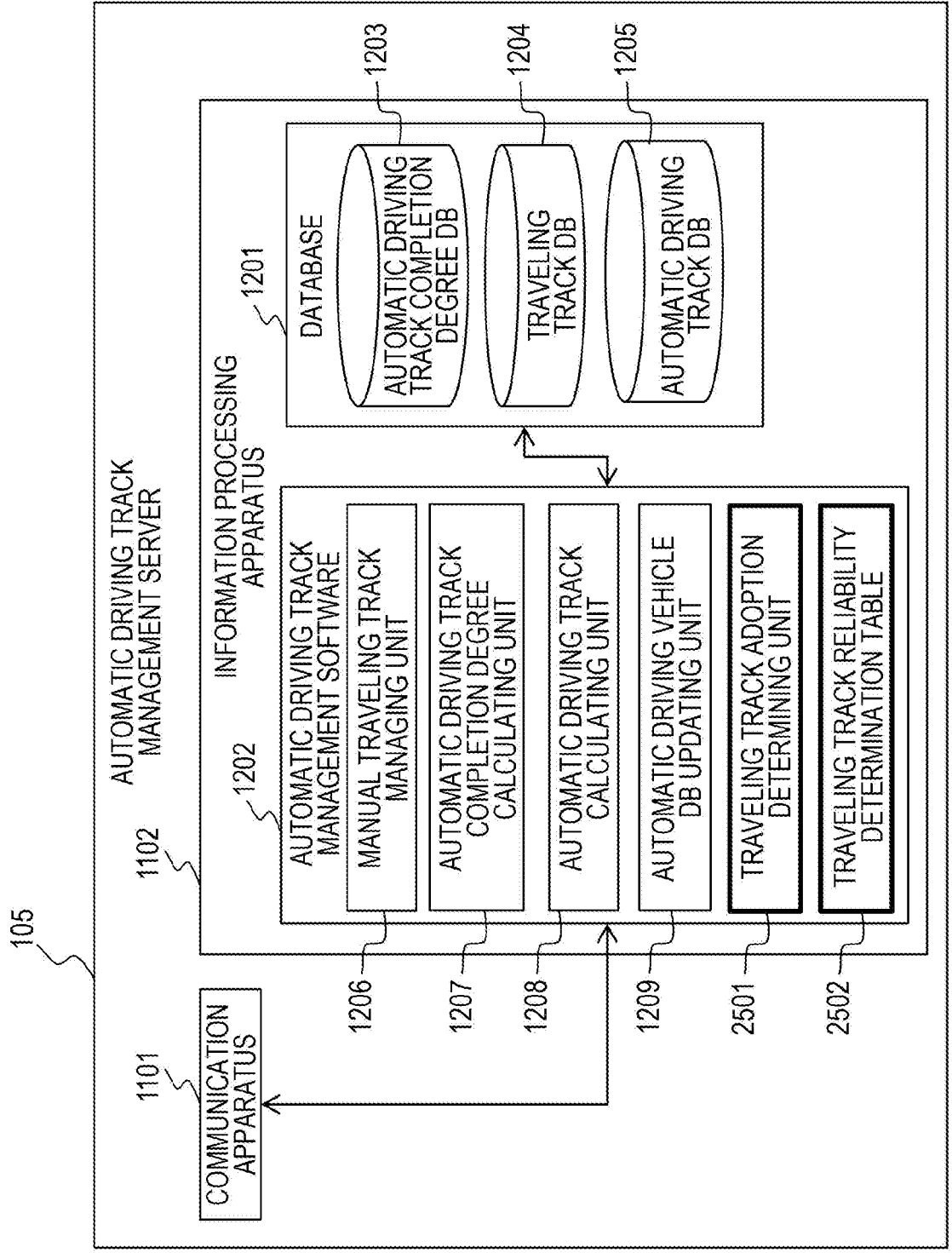
FIG. 24 is a block diagram showing a software configuration of an automatic driving track management server according to the third embodiment of the present invention.

FIG. 24 is a block diagram showing a software configuration of the automatic driving track management server 105 according to the third embodiment of the present invention.

Automatic driving track management software 1202 of the automatic driving track management server 105 according to the third embodiment further includes a traveling track adoption determining unit 2501 and a traveling track reliability determination table 2502. The traveling track reliability determination table 2502 is a table that holds a determination reference for determining a reliability of an acquired traveling track from the sensor values acquired from an automatic driving vehicle 101 when the automatic driving vehicle 101 travels by manual driving. The traveling track adoption determining unit 2501 receives the sensor values from the automatic driving vehicle 101 when the automatic driving vehicle 101 travels by the manual driving, determines the reliability of the traveling track from the sensor values with reference to the traveling track reliability determination table 2502, and notifies the manual traveling track managing unit 1206 to adopt the traveling track only when the reliability is a predetermined threshold value or more.

FIG. 25 is an explanatory diagram showing an example of the traveling track reliability determination table 2502 according to the third embodiment of the present invention.

The traveling track reliability determination table 2502 includes a maximum acceleration reliability determination table 2601, a minimum acceleration reliability determination table 2611, and a maximum speed reliability determination table 2621.

The traveling track reliability determination table 2502 includes a maximum acceleration $g_{max}$ 2602 and a reliability 2603. In the example of FIG. 25, when the maximum acceleration $g_{max}$ is 0 or more and less than 2, the reliability is determined to be 0.15.

For example, when a maximum acceleration measured when a certain traveling track is acquired exceeds a predetermined value (4 [m/s$^2$] in the example of FIG. 25), it is considered that sudden start has been performed. In the present embodiment, it is determined that a traveling track acquired in such traveling has a low reliability, and it is difficult to adopt the traveling track for creating an automatic driving track.

The minimum acceleration reliability determination table 2611 includes a minimum acceleration $g_{min}$ 2612 and a reliability 2613. In the example of FIG. 25, when the minimum acceleration $g_{min}$ is −2 or more and less than 0, the reliability is determined to be 0.15.

For example, when a minimum acceleration measured when a certain traveling track is acquired is less than a predetermined value (−4 [m/s$^2$] in the example of FIG. 25), it is considered that sudden stop has been performed. In the present embodiment, it is determined that a traveling track acquired in such traveling has a low reliability, and it is difficult to adopt the traveling track for creating an automatic driving track.

The maximum speed reliability determination table 2621 includes a maximum speed $v_{max}$ 2622 and a reliability 2623. In the example of FIG. 25, when the maximum speed $v_{max}$ is less than 50, the reliability is determined to be 0.15.

For example, when a maximum speed measured when a certain traveling track is acquired exceeds a predetermined value (60 [km/h] in the example of FIG. 25), it is considered that traveling at a speed exceeding a speed limit has been performed. In the present embodiment, it is determined that a traveling track acquired in such traveling has a low reliability, and it is difficult to adopt the traveling track for creating an automatic driving track.

Here, a case where a threshold value when the traveling track adoption determining unit 2501 determines whether or not to adopt the traveling track is 0.25 has been described, but this value is an example, and can be set to an appropriate value for whether or not to adopt the traveling track.

For example, when $g_{max}$=3, $g_{min}$=−1, and $v_{max}$=55 as the sensor values received from the automatic driving vehicle 101, a reliability is 0.05+0.15+0.05=0.25. This reliability is the threshold value (0.25) or more, such that the traveling track of the automatic driving vehicle 101 transmitting the sensor values is adopted.

On the other hand, when $g_{max}$=0.5, $g_{min}$=−3, and $v_{max}$=58 as the sensor values received from the automatic driving vehicle 101, a reliability is 0+0.05+0.05=0.10, which is less than the threshold value, such that the traveling track of the automatic driving vehicle 101 transmitting these sensor values is not adopted.

A case where the traveling track adoption determining unit 2501 and the traveling track reliability determination table 2502 are disposed in the automatic driving track management server has been shown in the above example, but the traveling track adoption determining unit 2501 and the traveling track reliability determination table 2502 may also be disposed in the automatic driving vehicle 101.

According to the present embodiment, even in a system for generating an automatic driving track from manual traveling tracks of general users, a traveling situation such as absence of sudden start, sudden stop, or speed excess is estimated from the sensor values, and a traveling track considered to have a low reliability based on the estimated driving situation is excluded from generation of an automatic driving track, such that it is possible to generate an automatic driving track having a high reliability.

Fourth Embodiment

A fourth embodiment of the present invention will be described with reference to FIGS. 26 to 28. Since the respective portions of a system according to a fourth embodiment have the same functions as those of the respective portions denoted by the same reference numerals as those of the first to third embodiments except for differences described below, a description thereof will be omitted.

In the present embodiment, configurations of an automatic driving vehicle 101 and an automatic driving track management server 105 are different from those of the first embodiment.

Figure 26:
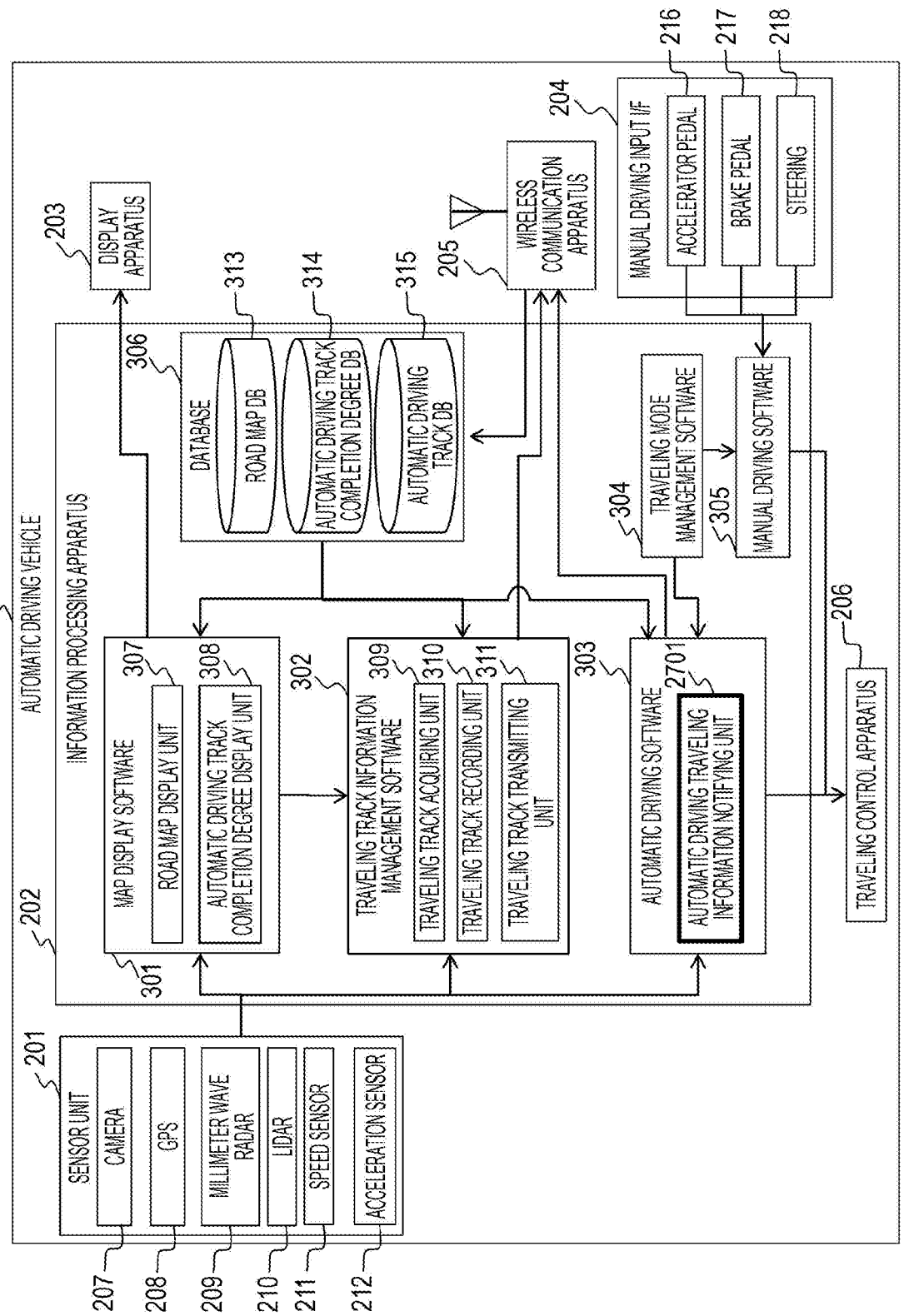
FIG. 26 is a block diagram showing a software configuration of an automatic driving vehicle according to a fourth embodiment of the present invention.

FIG. 26 is a block diagram showing a software configuration of an automatic driving vehicle 101 according to the fourth embodiment of the present invention.

Automatic driving software 303 of the automatic driving vehicle 101 according to the fourth embodiment includes an automatic driving traveling information notifying unit 2701. The automatic driving traveling information notifying unit 2701 acquires automatic driving traveling information while the automatic driving vehicle 101 travels by automatic driving, and notifies the automatic driving track management server 105 of automatic driving traveling information associated with a road ID through a wireless communication apparatus 205.

Here, the automatic driving traveling information may be any information as long as it is information on stability of automatic driving traveling. For example, the automatic driving traveling information may be information such as an approach distance to an obstacle while the automatic driving vehicle 101 travels by the automatic driving, the number of times by which sudden deceleration is performed, the number of times by which the automatic driving track goes over to an opposing lane, or an event in which the automatic driving is canceled, or may be another information. In the present embodiment, the automatic driving traveling information will be described as the event in which automatic driving is canceled.

Figure 27:
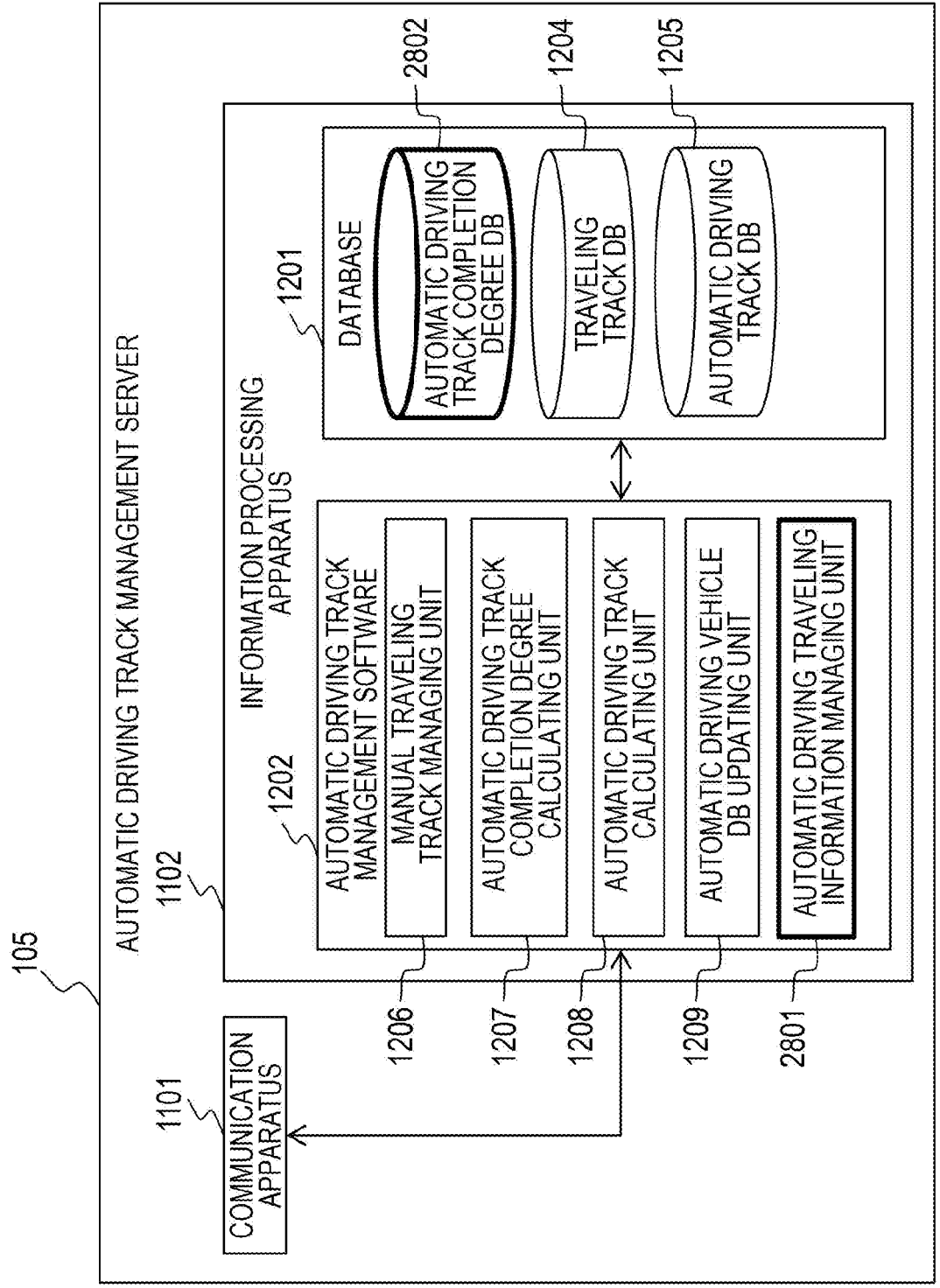
FIG. 27 is a block diagram showing a software configuration of an automatic driving track management server according to the fourth embodiment of the present invention.

FIG. 27 is a block diagram showing a software configuration of the automatic driving track management server 105 according to the fourth embodiment of the present invention.

A database 1201 of the automatic driving track management server 105 according to the fourth embodiment includes an automatic driving track completion degree DB 2802 instead of the automatic driving track completion degree DB 1203. The automatic driving track completion degree DB 2802 stores automatic driving traveling information, in addition to an automatic driving track completion degree corresponding to a road ID. In the present embodiment, the number of times of occurrence of the event in which the automatic driving is canceled is stored as the automatic driving traveling information (see FIG. 28).

In addition, automatic driving track management software 1202 of the automatic driving track management server 105 according to the fourth embodiment further includes an automatic driving traveling information managing unit 2801. The automatic driving traveling information managing unit 2801 updates automatic driving traveling information (that is, the number of times of occurrence of the automatic driving cancellation) of a corresponding road ID in the automatic driving track completion degree DB 2802 when it receives the automatic driving traveling information. In addition, the automatic driving traveling information managing unit 2801 updates an automatic driving track completion degree of the corresponding road ID in the automatic driving track completion degree DB 2802 and a traveling track of a corresponding road ID in a traveling track DB 1204 depending on the automatic driving traveling information in the automatic driving track completion degree DB 2802.

Figure 28:
FIG. 28 is an explanatory diagram showing an example of a configuration of an automatic driving track completion degree DB according to the fourth embodiment of the present invention.

FIG. 28 is an explanatory diagram showing an example of a configuration of the automatic driving track completion degree DB 2802 according to the fourth embodiment of the present invention.

The automatic driving track completion degree DB 2802 includes a road ID 901, an automatic driving track completion degree 902, and the number of times of automatic driving cancellation 2901, which is an example of the automatic driving traveling information.

Next, an example of a specific process of the automatic driving traveling information managing unit 2801 will be described. The automatic driving traveling information managing unit 2801 considers that a reliability of an automatic driving track is low when the number of times of the automatic driving cancellation becomes 3, which is the threshold number of times, and clears an automatic driving track corresponding to a corresponding road ID in an automatic driving track DB 1205 and the corresponding traveling track in the traveling track DB 1204. A cause is assumed that reliability is low, for example, a shape of a road is changed or the generated automatic driving track goes over to the opposing lane.

For example, in a state in which the automatic driving track completion degree DB 2802 is shown in FIG. 28, when the automatic driving traveling information managing unit 2801 is notified of automatic driving cancellation corresponding to a road ID: 1 as the automatic driving traveling information, the number of times of automatic driving cancellation 2901 of the automatic driving track completion degree DB 2802 becomes 3, and thus, arrives at the above threshold value. The automatic driving traveling information managing unit 2801 updates the automatic driving track completion degree 902 corresponding to the road ID: 1 to 0. Further, the automatic driving traveling information managing unit 2801 clears an automatic driving track (coordinate group) corresponding to the road ID: 1 with reference to the automatic driving track DB 1205. Further, the automatic driving traveling information managing unit 2801 clears both of a traveling track 1 1402 to a traveling track 3 1404 corresponding to the road ID: 1 with reference to the traveling track DB 1204.

A case where the automatic driving traveling information is the number of times of the automatic driving cancellation has been described in the present embodiment, but this is an example, and other values can be used as the automatic driving traveling information. For example, the automatic driving traveling information may be a combination of the road ID and a time at which the automatic driving vehicle 101 travels on the road. The automatic driving track management server 105 may manage a final traveling time of a road of which an automatic driving track is completed, determine that a reliability of the automatic driving track of the road has become low when the automatic driving vehicle 101 has not traveled by the automatic driving for a threshold time or more from the final traveling time, and clear the automatic driving track and the traveling track.

For example, since a quality of a traveling track used to generate an automatic driving track is low, there is a case where an automatic driving track having a low reliability is generated. In addition, there is also a case where a reliability of an automatic driving track, which was sufficiently high at a point in time in which the automatic driving track is generated, is decreased afterwards, such as a case where any change is generated to a road itself or a case where there is any change in an environment around the road. According to the present embodiment, when the reliability of the automatic driving track generated from the traveling track of the user is low, for example, for the reason as described above, the system can detect the decrease in the reliability and generate a new (that is, more reliable) automatic driving track.

The present invention is not limited to the abovementioned embodiments, but includes various modified examples. For example, the abovementioned embodiments have been described in detail for a better understanding of the present invention, and are not necessarily limited to including all the components described. In addition, some of the components of any embodiment can be replaced by components of another embodiment, and components of another embodiment can be added to components of any embodiment. In addition, it is possible to add, delete, and replace other components with respect to some of the components of the respective embodiments.

In addition, each of the above components, functions, processing units, processing means and the like, may be realized by hardware by designing some or all of them with, for example, an integrated circuit. In addition, each of the above components, functions, and the like may be realized by software by interpreting and executing a program realizing each function by a processor. Information such as a program, a table, or a file that realizes each function can be stored in a storage device such as a nonvolatile semiconductor memory, a hard disk drive, or a solid state drive (SSD), or a computer readable non-transitory data storage medium such as an integrated chip (IC) card, a security digital (SD) card, or a digital versatile disk (DVD).

In addition, control lines and information lines considered to be necessary for the description are shown, and all control lines or information lines are not necessarily shown for a product. In fact, it may be considered that almost all the components are connected to each other.

What is claimed is:

1. An information processing apparatus comprising: a processor; a storage device that is connected to the processor; a display apparatus that is connected to the processor; and a communication apparatus that is connected to the processor and communicates with a server apparatus,
wherein the storage device holds map information indicating a connection relationship between roads,
when the processor receives information indicating a completion degree of automatic driving track information including coordinate values of a traveling track when a vehicle travels on each road by automatic driving from the server apparatus through the communication apparatus, the processor holds the information indicating the completion degree in the storage device,
update a traveling track number to a first predetermined amount, a coordinate number to a second predetermined amount, and a coordinate of the coordinate number to a third predetermined amount, determine if a value is stored corresponding to the updated traveling track number and the updated coordinate number, when the value stored corresponds, determine if the updated traveling track number is less than or equal to a predetermined amount, when the updated traveling track number is less than or equal to the predetermined amount, update the coordinate of the coordinate number to include a coordinate of the coordinate number among coordinate point groups of the traveling track number, and update the traveling track number by one, when the updated traveling track number is greater than the predetermined amount, update the coordinate of the coordinate number to the coordinate number divided by the predetermined amount, update the traveling track number to the first predetermined amount, and update the coordinate number by one, update the coordinate of the coordinate number to the third predetermined amount, when the value stored does not correspond, store the coordinate of the coordinate number as a driving track, and the display apparatus displays a map including the roads based on the map information and the driving track, and superimposes and displays information indicating the completion degree calculated for each of the roads on the map.

2. The information processing apparatus according to claim 1, wherein the information processing apparatus is mounted in the vehicle, the processor transmits traveling track information including coordinate values of a track of the vehicle traveling on a road by manual driving to the server apparatus through the communication apparatus, the completion degree is a ratio of an amount of the traveling track information that has been already received by the server apparatus to an amount of the traveling track information determined to be required for calculating the coordinate values of the track of the road used for the automatic driving of the vehicle, the ratio being calculated for each of the roads, the information indicating the completion degree is an incentive value that is calculated based on the completion degree and is an incentive for allowing the vehicle to travel on the road by the manual driving, and the incentive value is calculated so that the incentive value of the road of which the completion degree is 1 indicating that the automatic driving track information is completed is the lowest and the incentive value of the road of which the completion degree is less than 1 becomes larger as the completion degree becomes larger.

3. An automatic driving track management system comprising:

an information processing apparatus that is mounted in a vehicle; and a server apparatus that communicates with the information processing apparatus, wherein the information processing apparatus transmits traveling track information including coordinate values of a track of the vehicle traveling on a road by manual driving to the server apparatus, and a plurality of coordinate numbers including the coordinate number, and each of the plurality of coordinate numbers corresponds to one of the coordinate values, the server apparatus calculates a completion degree of automatic driving track information including coordinate values of a track on which the vehicle travels by automatic driving, for each road, based on the traveling track information received from the information processing apparatus, and transmits information indicating the calculated completion degree to the information processing apparatus, and a display apparatus displays a map including the roads based on map information and the automatic driving track information, and superimposes and displays information indicating the completion degree calculated for each of the roads on the map.

4. The automatic driving track management system according to claim 3, wherein the server apparatus calculates a ratio of an amount of the traveling track information that has been already received to an amount of the traveling track information determined to be required for calculating the coordinate values of the track of the road used for the automatic driving of the vehicle as the completion degree of the automatic driving track information, for each of the roads.

5. The automatic driving track management system according to claim 4, wherein the server apparatus counts the number of times of collection of the traveling track information and calculates a ratio of the counted number of times of collection to a predetermined number of times of collection as the completion degree of the automatic driving track information, for each of the roads.

6. The automatic driving track management system according to claim 4, wherein the server apparatus calculates an incentive value that is an incentive for allowing the vehicle to travel on the road by the manual driving as information indicating the completion degree on the basis of the calculated completion degree for each of the roads, and transmits the incentive value to the information processing apparatus, and the information processing apparatus outputs the incentive value for each of the roads.

7. The automatic driving track management system according to claim 6, wherein the server apparatus calculates the incentive value so that the incentive value of the road of which the completion degree is a value indicating completion of the automatic driving track information is the lowest and the incentive value of the road of which the completion degree is not the value indicating the completion of the automatic driving track information becomes larger as the completion degree becomes larger.

8. The automatic driving track management system according to claim 3, further comprising:

a positioning apparatus that measures a position of the vehicle, wherein the traveling track information includes a plurality of coordinate values measured by the positioning apparatus when the vehicle travels on the road by the manual driving.

9. The automatic driving track management system according to claim 8, further comprising:

a speed sensor that measures a speed of the vehicle, wherein the traveling track information includes a speed measured by the speed sensor at a point in time in which each of the coordinate values is measured.

10. The automatic driving track management system according to claim 3, further comprising:
a sensor that measures a traveling situation of the vehicle,
wherein the information processing apparatus transmits information indicating the traveling situation of the vehicle measured by the sensor when the coordinate value of the track of the vehicle is measured to the server apparatus, and
the server apparatus holds first reference information for determining a reliability of the traveling track information based on the information indicating the traveling situation of the vehicle, and does not use the traveling track information determined to have a low reliability based on the information indicating the traveling situation of the vehicle received from the information processing apparatus and the first reference information to calculate the completion degree.

11. The automatic driving track management system according to claim 10, wherein
the sensor includes at least one of an acceleration sensor that measures an acceleration of the vehicle or a speed sensor that measures a speed of the vehicle, and
the first reference information includes information for determining that a reliability of the information indicating the traveling situation of the vehicle is low, when a maximum value of the acceleration included in the information indicating the traveling situation of the vehicle is larger than a predetermined value, when a minimum value of the acceleration included in the information indicating the traveling situation of the vehicle is smaller than a predetermined value, or when a maximum value of the speed included in the information indicating the traveling situation of the vehicle is larger than a predetermined value.

12. The automatic driving track management system according to claim 3, wherein
the server apparatus generates the automatic driving track information including the coordinate values of the track on which the vehicle travels by the automatic driving, based on the traveling track information, for a road of which the completion degree of the automatic driving track information becomes a value indicating that the automatic driving track information is completed,
the vehicle travels by the automatic driving using the automatic driving track information acquired from the server apparatus,
the information processing apparatus transmits automatic driving traveling information which is information on the traveling by the automatic driving performed by the vehicle to the server apparatus, and
the server apparatus holds second reference information for determining a reliability of the automatic driving track information based on the automatic driving traveling information, determines a reliability of the automatic driving track information that has been already completed, based on the received automatic driving traveling information and the second reference information, and deletes the automatic driving track information determined to have a low reliability and updates a completion degree of the automatic driving track information to information indicating that the automatic driving track information is not completed.

13. The automatic driving track management system according to claim 12, wherein
the information processing apparatus transmits identification information of a road on which the vehicle travels when the automatic driving is canceled and information indicating that the automatic driving is canceled as the automatic driving traveling information to the server apparatus, when the automatic driving started once by the vehicle is canceled, and
the second reference information includes information for determining a reliability of the automatic driving track information on each road based on a number of times of automatic driving cancellation occurred on each road.

14. The automatic driving track management system according to claim 12, wherein
the information processing apparatus transmits information for identifying a road on which the vehicle travels by the automatic driving and information indicating a time at which the vehicle travels as the automatic driving traveling information to the server apparatus, and
the second reference information includes information for determining a reliability of the automatic driving track information on each road based on a length of a time from a time at which the traveling by the automatic driving on each road is last performed to a present time.

15. The automatic driving track management system according to claim 3, wherein
the information processing apparatus includes a processor, a storage device that is connected to the processor, a display apparatus that is connected to the processor, and a communication apparatus that is connected to the processor and communicates with the server apparatus,
the storage device holds map information indicating a connection relationship between the roads, and
the display apparatus displays a map including the roads based on the map information, and superimposes and displays information indicating the completion degree calculated for each of the roads on the map.

* * * * *